US009900309B2

(12) United States Patent
Toth

(10) Patent No.: US 9,900,309 B2
(45) Date of Patent: Feb. 20, 2018

(54) METHODS FOR USING DIGITAL SEALS FOR NON-REPUDIATION OF ATTESTATIONS

(71) Applicant: Kalman Csaba Toth, Portland, OR (US)

(72) Inventor: Kalman Csaba Toth, Portland, OR (US)

(*) Notice: Subject to any disclaimer, the term of this patent is extended or adjusted under 35 U.S.C. 154(b) by 0 days.

(21) Appl. No.: 15/497,635

(22) Filed: Apr. 26, 2017

(65) Prior Publication Data

US 2017/0230361 A1    Aug. 10, 2017

Related U.S. Application Data

(62) Division of application No. 14/503,797, filed on Oct. 1, 2014, now Pat. No. 9,646,150.

(51) Int. Cl.
*H04L 29/06* (2006.01)
*H04L 9/32* (2006.01)
(Continued)

(52) U.S. Cl.
CPC ........ *H04L 63/0861* (2013.01); *H04L 9/3247* (2013.01); *H04L 63/061* (2013.01);
(Continued)

(58) Field of Classification Search
CPC . G06F 17/30011; G06F 21/645; G06Q 10/06; H04L 63/126
(Continued)

(56) References Cited

U.S. PATENT DOCUMENTS 5,948,103 A * 9/1999 Fukuzaki ........... H04N 1/32101
713/176
6,401,206 B1    6/2002 Khan
(Continued)

FOREIGN PATENT DOCUMENTS

EP    1130491 B1    10/2006
EP    1470534 B1    10/2006
(Continued)

OTHER PUBLICATIONS

FIPS PUB 201-2, Federal Information Processing Standards Publication, Personal Identity Verification (PIV) of Federal Employees and Contractors.
(Continued)

*Primary Examiner* — Hadi Armouche
*Assistant Examiner* — Bryan Wright
(74) *Attorney, Agent, or Firm* — J. Curtis Edmondson; Anitha Shankar Narayan; Law Offices of J. Curtis Edmondson

(57) ABSTRACT

The described method is analogous to handling credentials in the physical world where agents and notary publics affix their attestations using their notary seals. The described method enables a person having a personal identity device and an electronic credential (e-credential) to create a digital seal to affix the owner's identity and attestation to an electronic artifact such as a transaction, document, or e-credential. The e-credential owner cannot repudiate having affixed the attestation to the electronic artifact. This enables other parties, including the e-credential owner, to inspect the digital seal affixed to the electronic artifact to identify the owner and the electronic artifact, verify the digital seal, and thereby obtain objective evidence that the attestation is truthful. The private embossing key of the owner's e-credential is used to cryptographically bind the owner's identity (Continued)

Depicting Personal Identity Device and Identity Bindings and attestation to the electronic artifact by means of a digital seal, while the public inspection key of the owner's e-credential is used to cryptographically verify the digital seal and attestation.

2 Claims, 11 Drawing Sheets

(51) Int. Cl.
    *H04W 12/06* (2009.01)
    *H04W 12/04* (2009.01)
    *H04W 12/08* (2009.01)
    *H04W 12/12* (2009.01)
    *G06F 21/64* (2013.01)

(52) U.S. Cl.
    CPC ...... *H04L 63/0823* (2013.01); *H04L 63/0853* (2013.01); *H04W 12/04* (2013.01); *H04W 12/06* (2013.01); *H04W 12/08* (2013.01); *H04W 12/12* (2013.01); *G06F 21/645* (2013.01); *H04L 63/126* (2013.01)

(58) Field of Classification Search
    USPC ........................................................ 713/171
    See application file for complete search history.

(56) References Cited

U.S. PATENT DOCUMENTS

| | | | |
|---|---|---|---|
| 7,310,734 B2 | 12/2007 | Boate et al. | |
| 7,565,540 B2 | 7/2009 | Bogasky | |
| 7,660,988 B2 | 2/2010 | Carmichael et al. | |
| 8,019,691 B2 | 9/2011 | Dominigueaz et al. | |
| 8,127,228 B2 * | 2/2012 | Cheng | G06F 17/30011 707/805 |
| 8,200,975 B2 * | 6/2012 | O'Connor | H04L 63/126 713/176 |
| 8,694,788 B1 * | 4/2014 | Thomas | H04L 63/08 713/165 |
| 2003/0120611 A1 * | 6/2003 | Yoshino | G06F 21/10 705/67 |
| 2003/0177361 A1 * | 9/2003 | Wheeler | G06F 21/32 713/176 |
| 2005/0125666 A1 * | 6/2005 | Lin | G06F 21/6209 713/170 |
| 2005/0188204 A1 * | 8/2005 | Rice | H04L 9/3247 713/176 |
| 2007/0118732 A1 * | 5/2007 | Whitmore | G06F 21/645 713/155 |
| 2007/0235517 A1 * | 10/2007 | O'Connor | G06Q 10/06 235/375 |
| 2009/0031135 A1 * | 1/2009 | Kothandaraman | G06F 21/64 713/176 |
| 2011/0085474 A1 * | 4/2011 | Honjo | G06F 21/6272 370/271 |

FOREIGN PATENT DOCUMENTS

| | | |
|---|---|---|
| EP | 2460307 A1 | 6/2012 |
| WO | WO2005020542 A1 | 3/2005 |

OTHER PUBLICATIONS

RSA Laboratories, B. Kaliski, PKCS #5: Password-Based Cryptography Specification, Version 2.0, Sep. 2000.
PKCS 12 v1.0: Personal Information Exchange Syntax, RSA Laboratories, Jun. 24, 1999.
Cooper D. et.al, Internet Engineering Taskforce (IETF), Internet X.509 Public Key Infrastructure Certificate and Certificate Revocation List (CRL) Profile, Network Workin.
Finney, H. et. al., Internet Engineering Taskforce (IETF), Open PGP Message Format, Network Working Group, Nov. 2007.
Ma, L., Tan, T., Wang, Y., and Zhang, D., "Efficient iris recognition by characterizing key local variations". IEEE Trans. Image Processing 13.6 (2004).
Gary Blair, SMS-delivered two-factor authentication will be dead in three years, 2007.
Paul Madsen (editor), Liberty Alliance Project White Paper, Liberty ID-WSF People Service, Dec. 5, 2005.

* cited by examiner

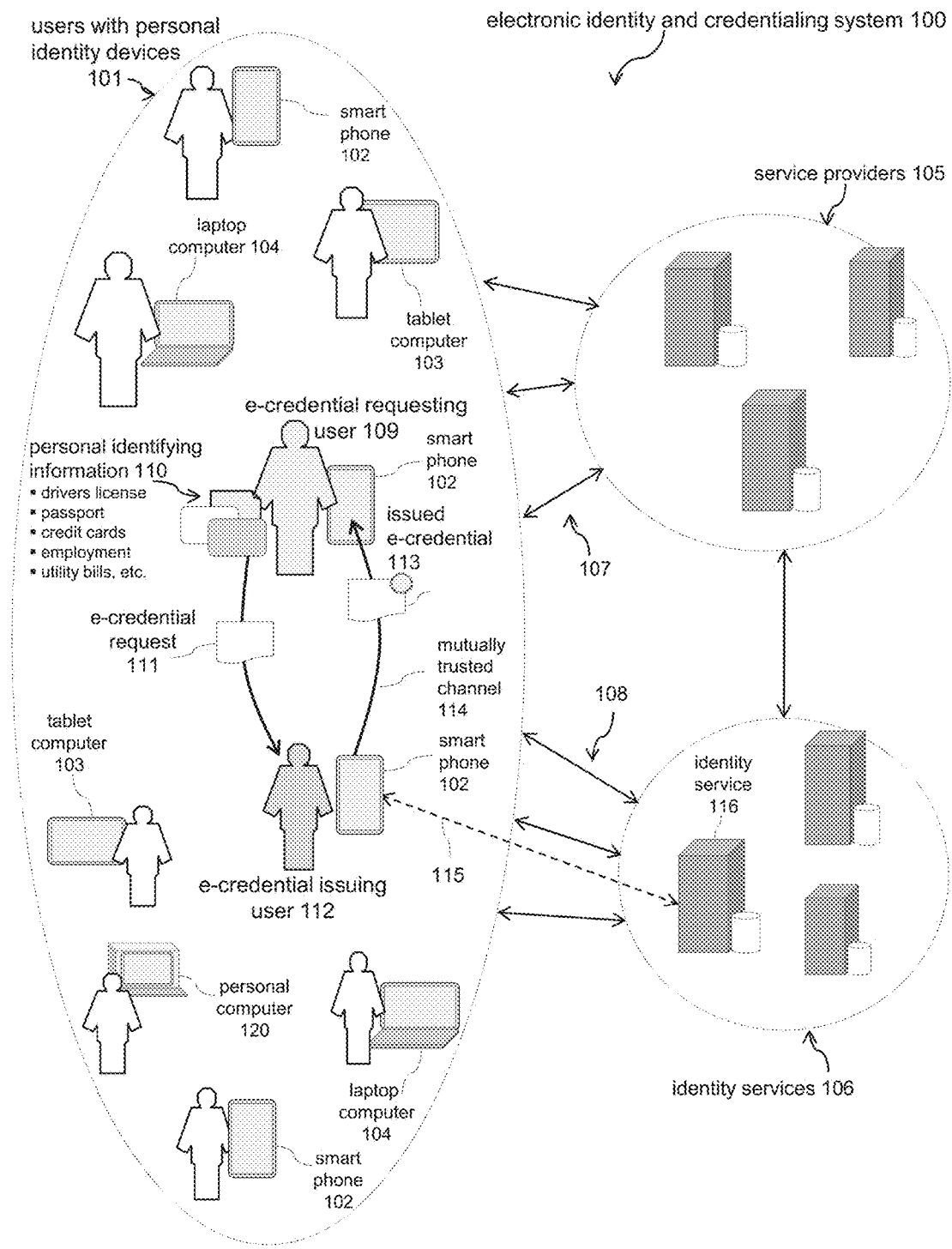
Figure 1 Depicting Scope of Electronic Identity and Credentialing System

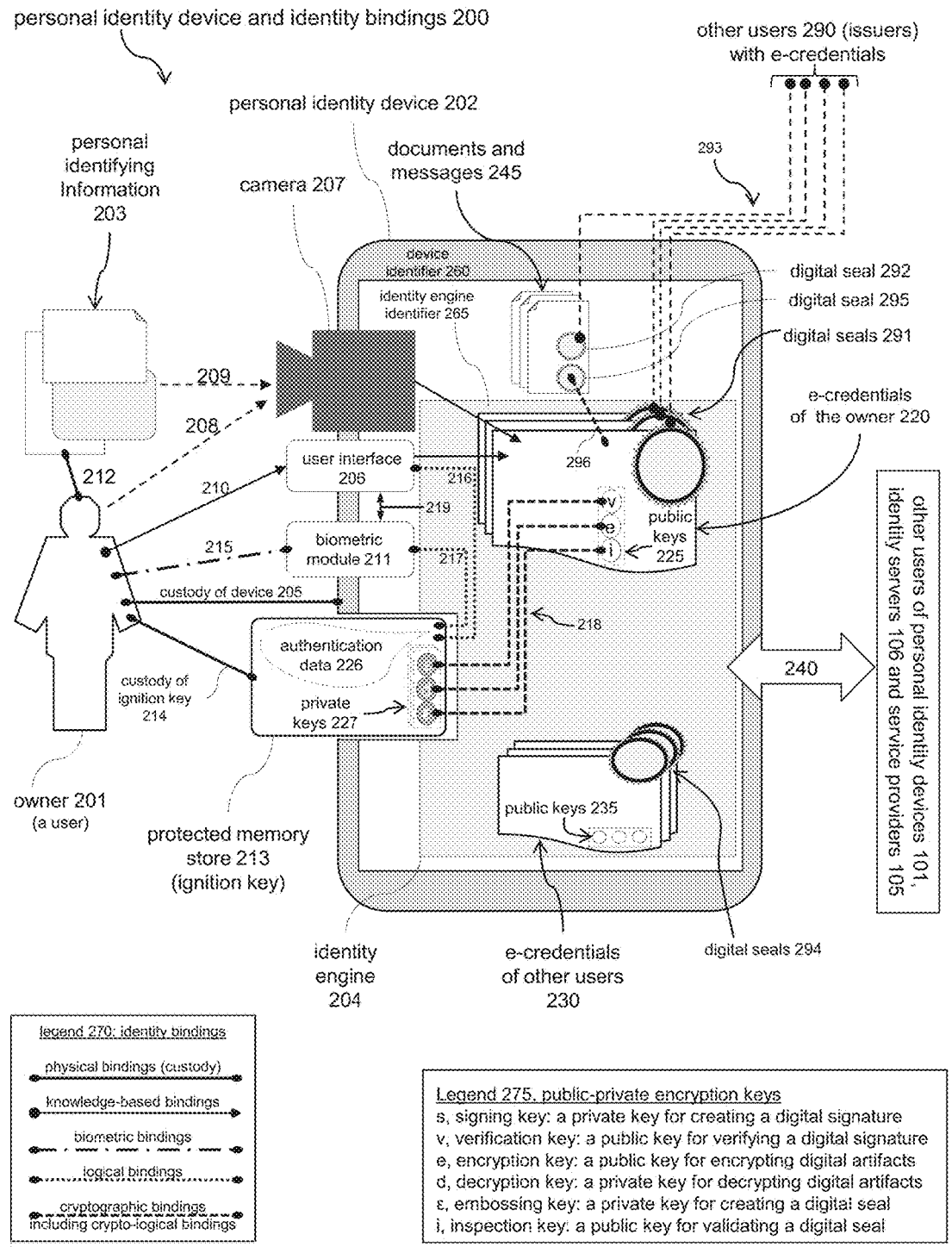
Figure 2 Depicting Personal Identity Device and Identity Bindings

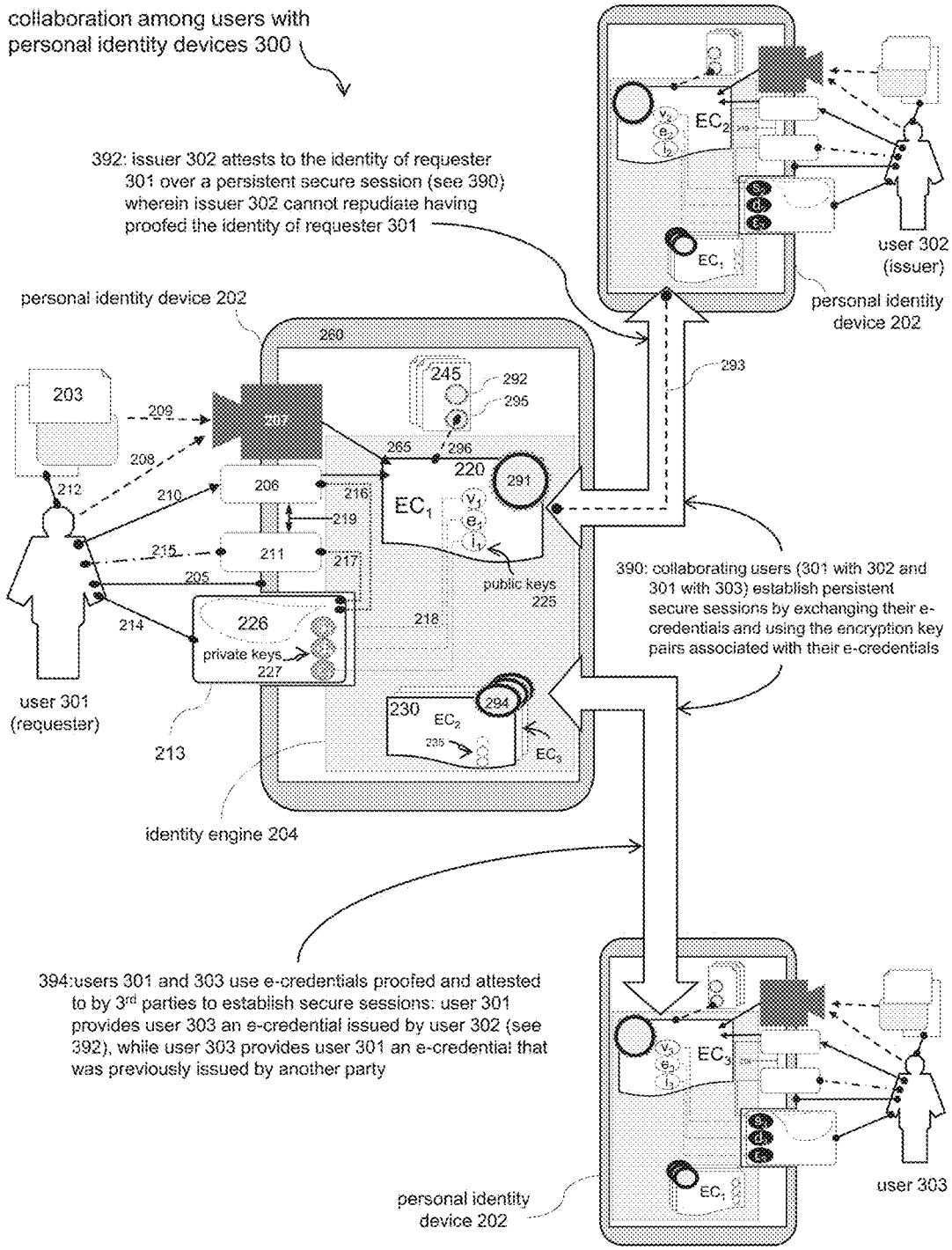
Figure 3 Depicting Collaboration Among Users with Personal Identity Devices

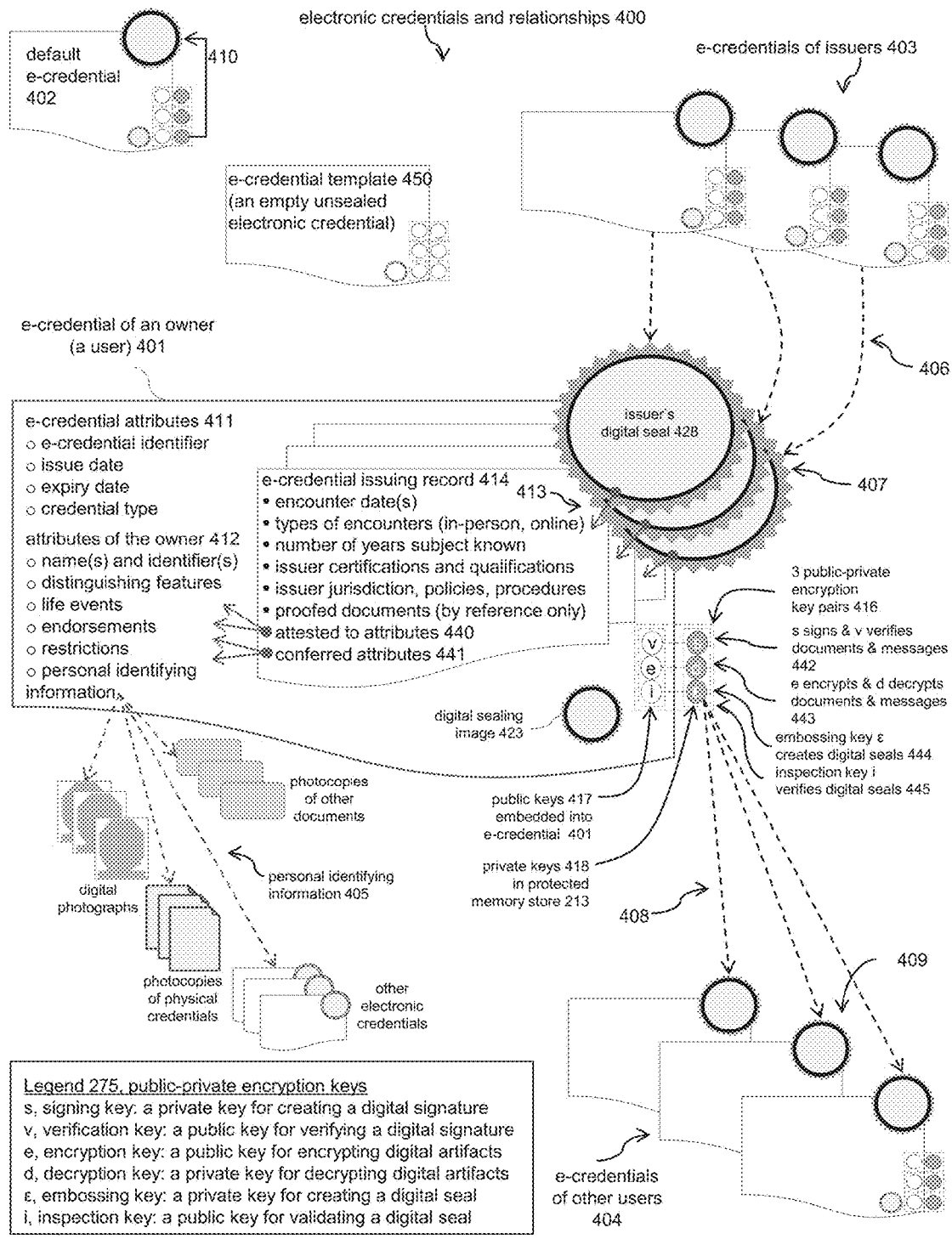
Figure 4 Depicting Electronic Credentials and Relationships

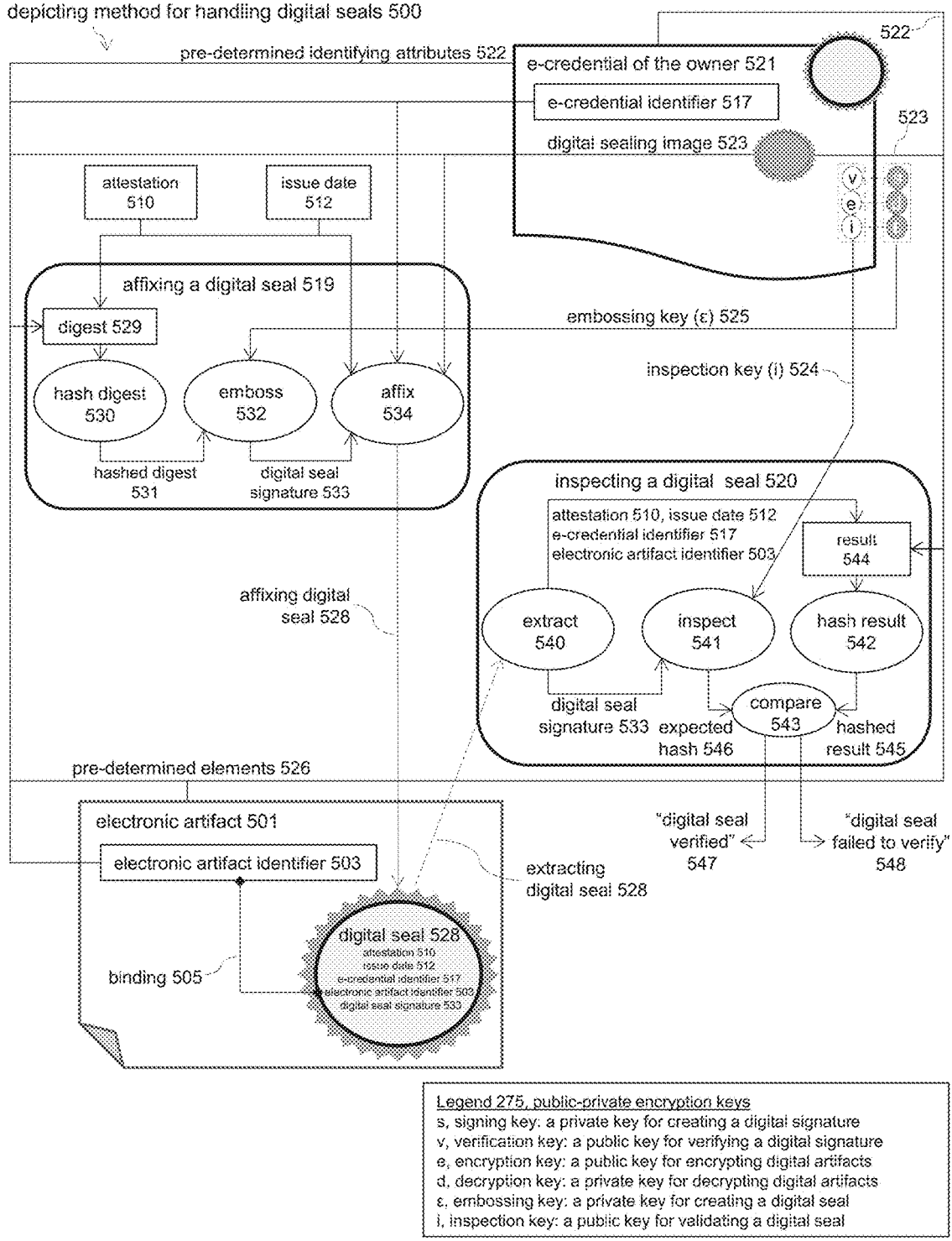
Figure 5 Depicting Method for Handling Digital Seals

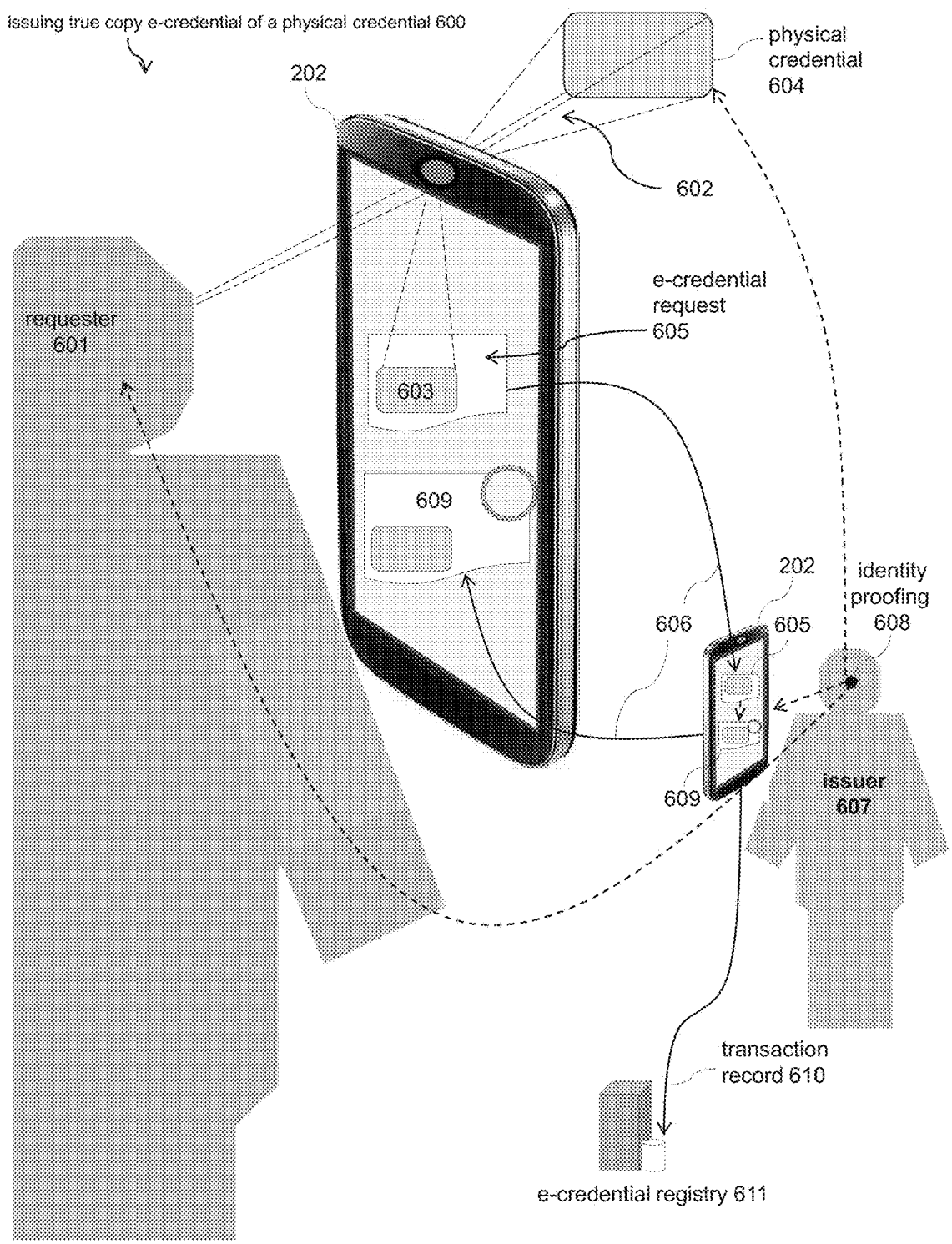
Figure 6 Usage Scenario: Issuing True Copy of a Physical Credential

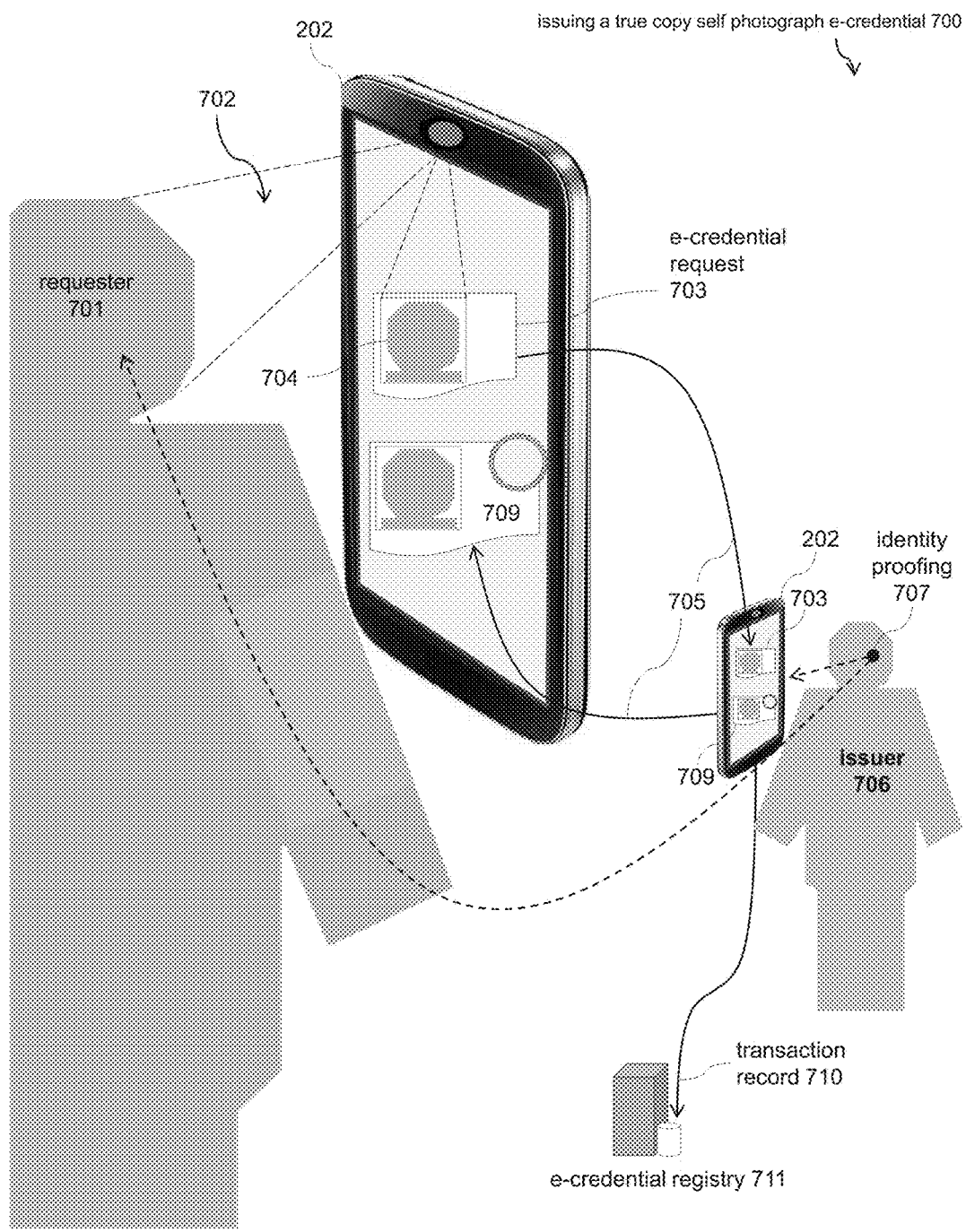
Figure 7 Usage Scenario: Issuing True Copy Self Photograph E-Credential

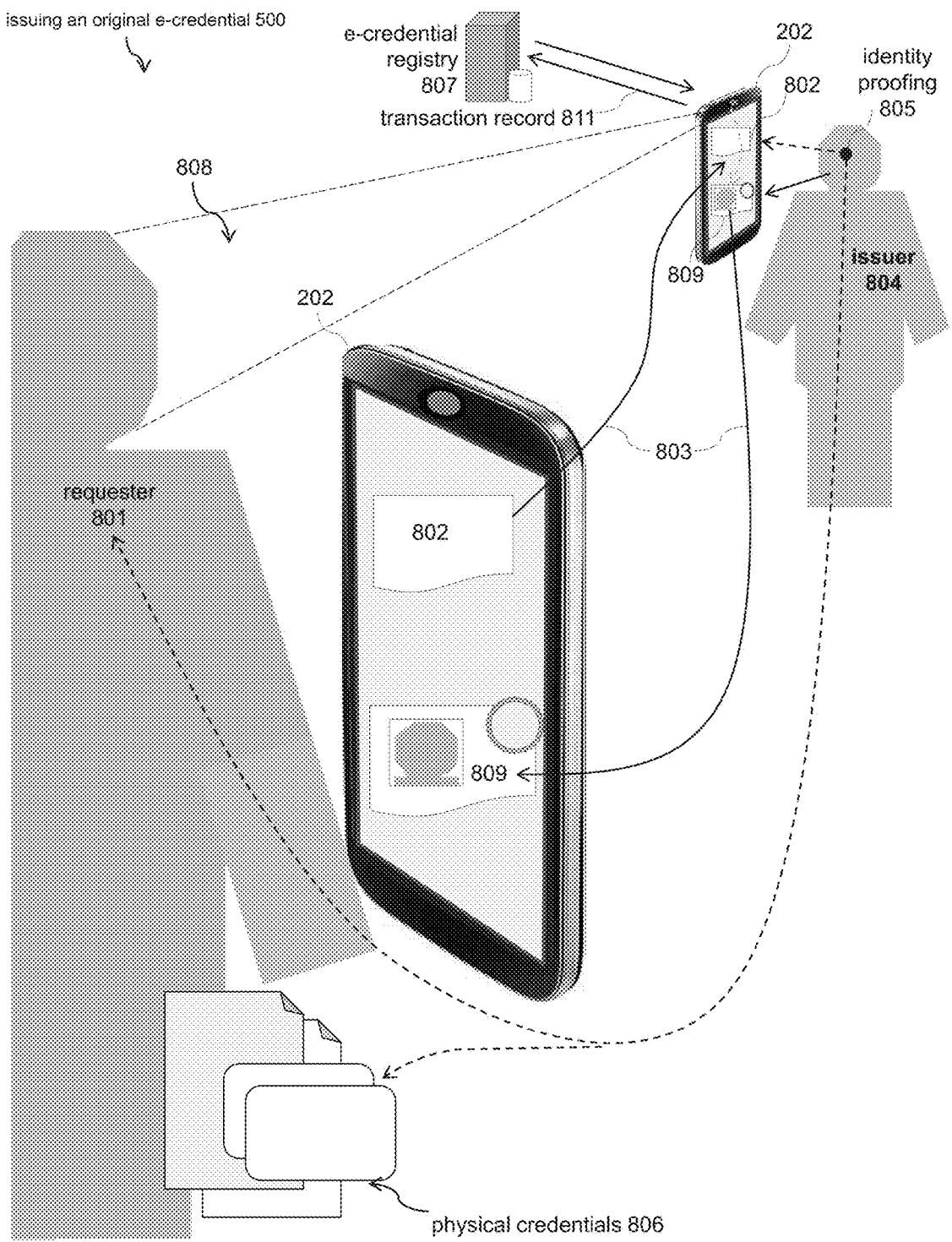
Figure 8 Usage Scenario: Issuing an Original E-Credential

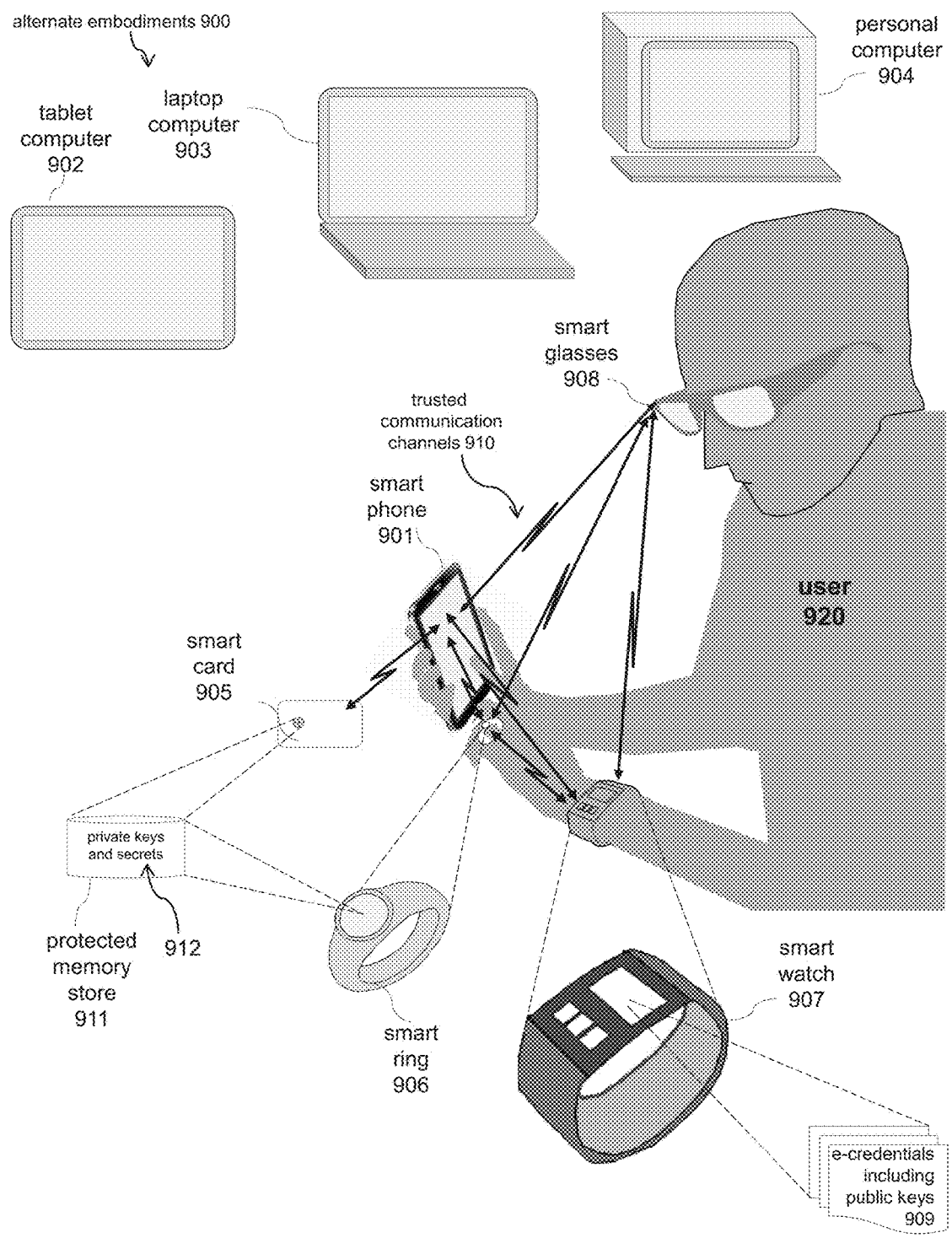
Figure 9 Alternate Embodiments of the Inventive Subject Matter

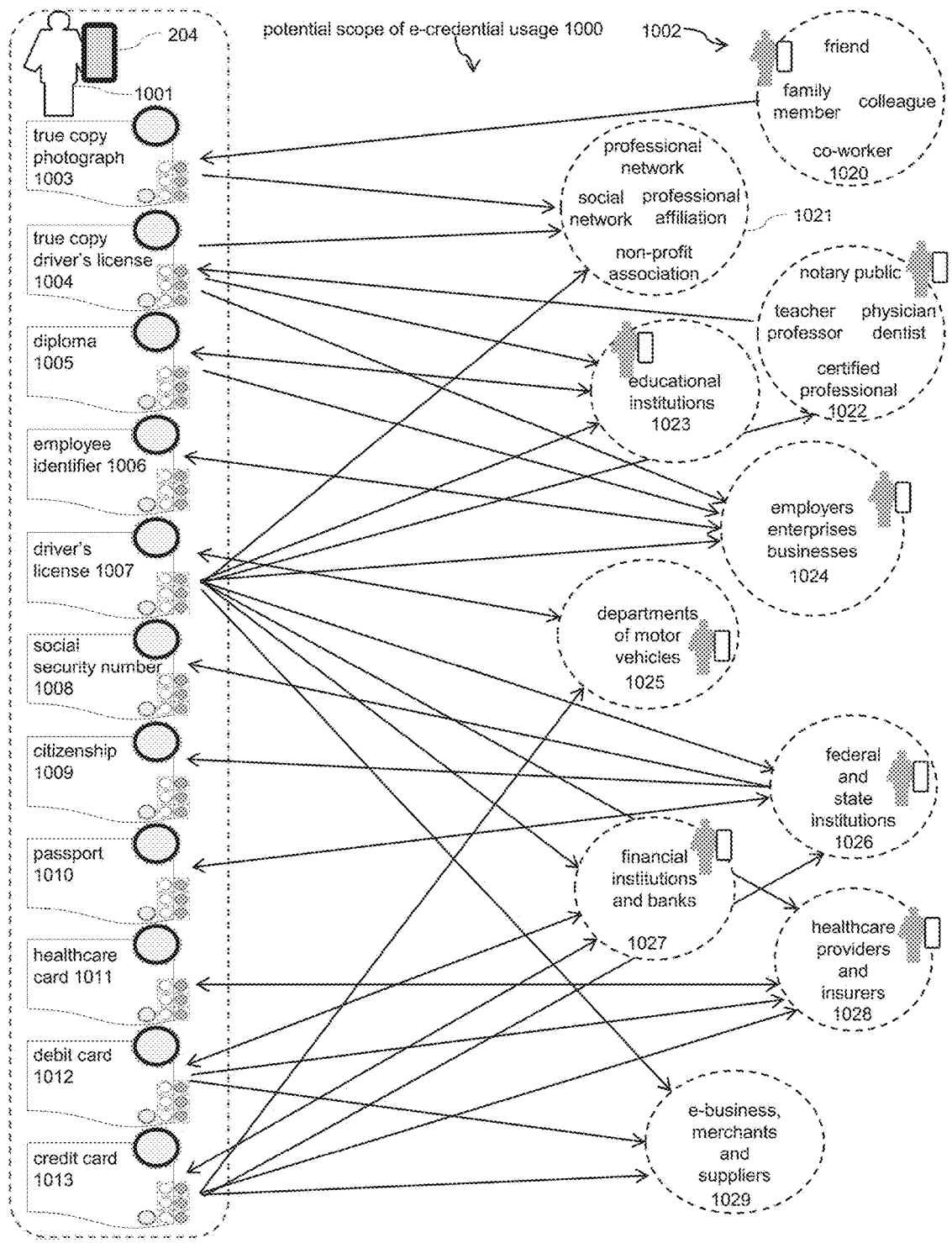
Figure 10 Depicting Potential Scope of E-Credential Usage

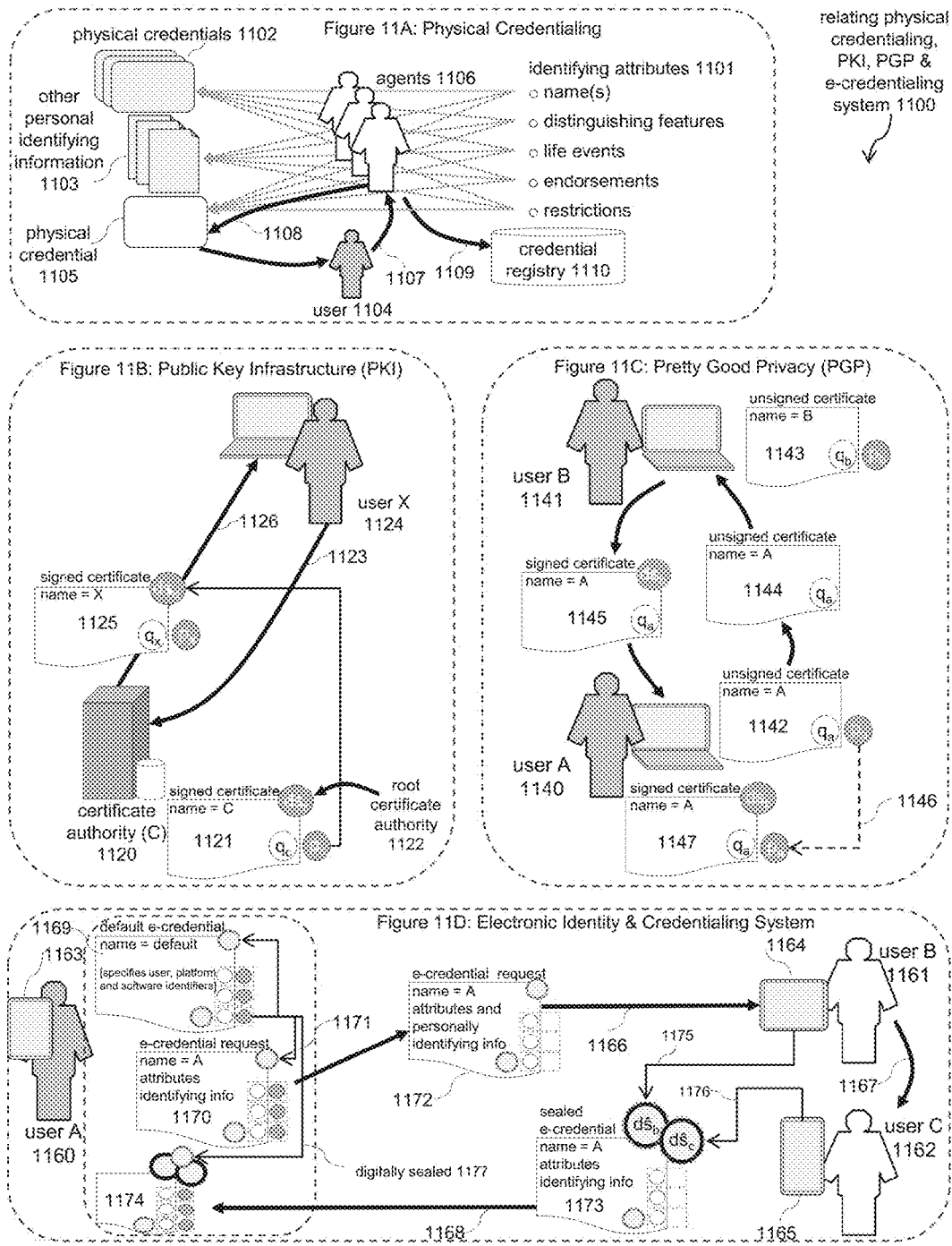
Figure 11 Relating Physical Credentialing, PKI, PGP & E-Credentialing System

METHODS FOR USING DIGITAL SEALS FOR NON-REPUDIATION OF ATTESTATIONS

CROSS REFERENCES TO RELATED APPLICATIONS

This application is a divisional application of U.S. Utility patent application Ser. No. 14/503,797, filed Oct. 10, 2014, entitled as "Electronic Identity and Credentialing System", and claims the benefit of U.S. Provisional Patent Application No. 61/885,251, filed Oct. 1, 2013, entitled as "Electronic Identity and Credentialing System", which is incorporated herein by reference in its entirety.

FIELD

The present invention relates to the field of identity provisioning and usage over information networks. The scope traverse's identity, credentials, credentialing, also known as identity provisioning, identity assurance, security, privacy, confidentiality, authentication, encryption, and identity management. To assist interpreting the field and scope, a glossary of terms relating to this field is provided as well figures and a list of reference numerals.

To ensure personal privacy while provisioning reliable identities for citizens and consumers, the specification, handling and deployment of personal identities needs to be modernized. To date, the provisioning of identities and credentials have been primarily the prevue of web service providers. For identity and credentialing to scale up and become significantly more trusted than existing schemes, individual persons must become increasingly engaged in vetting the identities of other persons and the issuing of credentials to them. Credential owners must be able to reliably and safely control their identities, and unauthorized persons should not be able to fraudulently use the identities of others.

In the real world, physical credentials such as driver's licenses and passports attesting to the identity of the holder are primarily issued by governments, banks, employers, and other types of organizations. Notably, the agents and HR departments of such organizations perform most of the necessary vetting and proofing procedures prior to credential issuance. Physical credentials are rarely issued by individuals to other individuals. However, notaries can issue certified true copies of documents to individuals, and professional engineers, doctors and other professionals can certify true copies of personal identifying information (e.g. passport applications).

Over the Internet, prior art Public Key Infrastructure (PKI), a hierarchical trust model, is the predominant identity provisioning scheme by which identities, in the form of digital certificates, are distributed electronically to enterprises—rarely to individuals. Another technology, Pretty Good Privacy (PGP), a web-of-trust model focused on the identity needs of individuals, employs digital certificates to enable secure communications among personal computers. PGP has enjoyed limited market penetration and was not specified to integrate with PKI. The escalating problems of electronic identity theft and fraud have not been solved by either of these technologies. The present invention significantly improves upon prior art PKI and PGP technologies.

E-fraud is perpetrated over information networks, such as the Internet and cellular networks, by way of identity theft, identity abuse, electronic stalking, spamming, advertising abuse, obfuscation, phishing and deception. Service providers and enterprise systems have been rapidly losing ground in their battle against web-based identity abuse and e-fraud, mainly because today's identity providers and technologies are not able to deliver identities to individuals that can only be readily used by the identity owner. As the Internet continues to grow rapidly in both size and complexity, the providers of web services and end-user computing devices are increasingly hard-pressed to keep up with the escalating breaches, compromised identities, and fraudulent activities—all widely reported across the web.

The essential difficulty in the field of electronic identity is that communicating parties are often unknown to each other, yet they need to conduct transactions with each other as if they were meeting face-to-face. In most circumstances today, a web user as well as a web server cannot be really sure who they are communicating with. Users may wonder if the web site they are visiting is bogus; if their service provider has been properly protecting their accounts and credit cards; if a virus or Trojan software is collecting their private information; or if a blog post is from an imposter or a stalker. The user is obliged to rely on legacy technologies that may be defective, poorly configured, and poorly administered.

For example, account/password authentication schemes are known to be vulnerable to compromise enabling user masquerade (spoofing), denial-of-service, and other abuses. The problems of users and servers managing multiple passwords, re-used passwords, weak passwords, and password resets are widely known. Furthermore, successful access into a system with account/password login only proves that the holder of the account has knowledge of the password; it does not validate the identity of the person knowing the password.

For remote parties to collaborate safely over the web, they need to be able to reliably authenticate each other over a communications channel that cannot be sniffed (read) or tampered with. In other words, they need to be strongly bound to each other across every hop from origination to destination ("end-to-end").

Single sign-on (SSO) and federated identity frameworks and technologies have addressed some of the challenges of enrolling users, specifying accounts and permissions, containing password proliferation, and managing user passwords. However, the structures for specifying user identities are fragmented, the methods for defining and issuing them are ad hoc, and effective credential interoperability does not exist at this time.

A wide variety of biometric technologies have emerged over the years and have been integrated into personal computers, smart phones, smart cards and various types of security tokens. Digital certificates have also been deployed on smart card technologies and USB thumb drives. Notably, FIPS PUB 201-2 for Personal Identity Verification (PIV) specifies a smart-card based identity card and related systems deployed by the U.S. Federal government.

The approach taken herein leverages selected aspects of prior art identity technologies and emulates identity issuance and usage in the physical world. Such an approach can be expected to facilitate adoption. Consider a driver's license. Such a credential bears the name and selected attributes of the owner, a photograph, the owner's signature, and certain endorsements and restrictions. After "proofing" the applicant against provided identifying information, the agent issues the license to the applicant. When used, the license attests to the owner's identity which the issuer cannot easily repudiate. If the license is borrowed or stolen and subsequently presented by someone other than the owner, the photograph and signature can be used by others to detect fraudulent use.

The present invention follows a similar process employing "personal identity devices". A wide range of electronic credentials can be specified therein such that they are information-wise equivalent to civil and consumer credentials such as driver's licenses, bank cards, employee IDs, and even business cards. Users, some of whom may be agents of identity provisioning services, are able to collaborate and securely exchange electronic identities that have been proofed and attested to by other users (issuers). The issuer's identity is cryptographically bound to the owner's electronic identity preventing the issuer from repudiating their attestation thereby elevating assurances for $3^{rd}$ parties. The personal identity device also leverages user authentication data to bind the user to their electronic identities. These features combine to elevate privacy, prevent identity tampering, and prevent others from using electronic credentials to masquerade as the identity owner.

The present invention specifies an electronic identity and credentialing system that combines and adapts prior art to achieve the following distinct features and capabilities:

Mimics identities and credentialing as practiced in the physical world to facilitate adoption;

Leverages growing population of consumers owning personal devices to create personal identity devices;

Enables personal identity device owners to specify, control, proof, attest to, issue, and use their identities for assured collaboration among themselves and secure web access;

Persistently binds owners to their identity devices, and hence their identities (e-credentials) and associated secrets (e.g. private keys and biometric minutia), by controlling local user authentication data;

Combines and adapts prior art, preventing $3^{rd}$ party masquerade, such that only a personal identity device owner can employ one of their identities (e-credentials) to execute privileged operations that ensure:

Messages, digitally signed under the owner's e-credential, were originated by that same owner;

Only the owner can read messages encrypted employing an e-credential of the owner;

Artifacts digitally sealed under the owner's e-credential must have been affixed by the owner;

Another user, having received a copy of an owner's e-credential, can challenge a user claiming to be that owner, thereby obtaining assurances that the provided e-credential actually represents the claimed owner;

Owners of personal identity devices can use their e-credentials in concert with the e-credentials of other owners to establish persistent, mutually trusted, secure sessions executing the above privileged operations;

An e-credential issuer can proof the personal identifying information of an e-credential requester, issuing a digitally sealed e-credential to the requester that attests to the requester's identity.

Users with personal identity devices and e-credentials that have been digitally sealed can thereby establish secure channels among themselves wherein they have positive assurances as to the other party's identity.

U.S. Pat. No. 7,660,988 by Camechael discloses an electronic notary process ("e-notary") wherein a notary and client can share a workstation, log onto a remote system, and notarize a submitted document by means of a cryptographic scheme that creates a record of the notarization event in the system's online repository. The present invention makes no claims related to using a centralized database to perform electronic notarization, instead specifying a distributed approach whereby users can attest to (e.g. notarize) each other's electronic documents and credentials using personally help identity devices.

WO2005020542 by Salim Aissi et al. discloses a method that binds a public key to specific hardware with an embedded private key to verify the identity and integrity of the trusted computing device. In contrast, the present invention, by means of a personal identity device held by the device owner, binds personal identities of the owner, including public and private keys associated with each identity, to the owner.

EP 2460307 by Jeffery B. Williams et al. discloses a system and methods for strong remote identity proofing, obtaining biographical information from the individual, and using this information to search public data repositories. No claims related to obtaining biographical information to search data depositories for identities are made herein.

EP 1470534 by Vipin Samar et al. discloses a method and apparatus for authenticating an individual's identity by validating a credential and corresponding public key, and comparing biometric data with sample data. No claims are made herein specifying any given biometric scheme or biometric data. Rather, the present invention encapsulates authentication data utilized by biometric mechanisms pre-installed on the personal identity device of the user.

EP 1130491 by Corella et al. discloses a method for structuring a digital certificate comprised of multiple authorization hashes that a relying party can use to access relevant authorization information. The present invention does not claim to create, filter, mask or hash authorization data that relying parties can use to make authorization decisions. In contrast, the present invention creates identities that can be provided to other parties to make authorization decisions outside the context and scope of the present invention.

U.S. Pat. No. 8,127,228 by Cheng et al. discloses a method and a system for electronic document management based on human memory wherein a digital seal is a personalized association mnemonic applied to a document comprised of, for example, icons and text. This prior art does not appear to apply cryptography, while the present invention uses cryptography, creating digital seals that can be visually rendered and cannot be repudiated by the e-credential owner;

U.S. Pat. No. 7,310,734 by Boate et al. discloses an improved network security system, methods and a personal identifier device, used to control network access and real time authentication of a user's identity and presence at a particular network access point. Biometric verification and cryptography is provided on-board the portable personal digital identifier device to provide authenticated digital signatures which are used for establishing secure access to data stored on a network and for performing secure transactions over a network. Biometric authentication is used to verify user presence, and biometric data is used to create digital signatures, subsequently used for secure access. In contrast, the present invention does not perform biometric verification or matching, or use biometric data to create digital signatures, instead holding authentication data, including biometric minutia, within an identity engine, and relying on an authentication control interfaced to a pre-existing biometric module (assumed to be present), to invoke user authentication and thereby establish user persistence.

U.S. Pat. No. 8,019,691 by Dominguez et al. discloses methods and systems for authenticating the identity and validating the profile data of an individual (presenter) who presents him or herself to another party (acceptor) performed online, possibly querying a trusted party for profile data. Although the present invention leverages an equivalent procedure called "identity proofing", the administrative (human) details of such a procedure are not specified and are incidental to the present claims. The present invention does, however, specify artifacts and methods needed to enable mutually trusted sessions between requesters and issuers when conducting identity proofing, a feature that is not addressed by this prior art.

U.S. Pat. No. 6,401,206 by Khan et al. discloses methods and computer programs for creating a portable digital identity of the individual that may include personal information, data representing the person's handwritten signature, one or more passwords, seals, fingerprints, biometric information, and answers to questions that are composed by the user. The digital identity can be used to bind a verifiable electronic impression with an electronic document using electronic watermarks so that any modification in the document or the electronic impression bound to the document can be detected. The digital identity of a user can be created once and stored after encryption for protection. This digital identity can then be used by the signer to bind a unique instance of an impression of the digital identity to any document. Document and digital identity verification including verifying a cryptographic digital signature that establishes the integrity of the document, enables non-repudiation of origin to the extent that it was signed by the user's private key.

An e-credential does not contain handwritten signature, passwords, biometric data (e.g. fingerprint minutia), answers to user questions, or other such sensitive information because an e-credential is normally disclosed to collaborating parties to support user collaboration. Also, the present invention does not attempt to generate public-private key pairs from personal identifying information to apply a cryptographic signature to documents, choosing instead to create three (3) public-private key pairs, embedding the public keys in the user's e-credential, and retaining the private keys in protected memory store (possibly removable) of the personal identity device which is strongly bound to the user. The present invention uses two of these public-private keys to support secure remote collaboration, which the prior art does not, reserving one of the key pairs for digital sealing and verifying of electronic documents. This prior art discloses that it ensures non-repudiation to the extent that the cryptographic signature was signed by the user's private key. In contrast, the present invention ensures that the private key (the "embossing" key) used to digitally seal an electronic document, is persistently in the custody of the user, thereby elevating non-repudiation strength over this prior art.

Password and PIN-based authentication schemes, despite their acknowledged weaknesses, continue to be used because of their ease-of-use and ease-of-implementation properties. Password-based remote password authentication schemes, including those using Personal Identity Numbers (PINs), have been long-demonstrated to be vulnerable to user masquerade. Local password and PIN-based schemes are less vulnerable as such user secrets are not exposed over intervening networks. However, the all too common practice has been for users to employ the same passwords and PINs for both local and remote access.

Employing a number of fairly straight-forward exploits (e.g. sniffing and social engineering) and readily available software tools for password-cracking, a malicious attacker can defeat traditional PIN and password-based authentication, using the acquired private information (account numbers and identifiers) and user secrets (the PINs and passwords themselves) to fraudulently tamper with online accounts. Risks can be reduced by introducing guidelines for creating stronger passwords, automated procedures for creating non-guessable passwords, augmenting these schemes with non-guessable security questions, incorporating behavioral analysis, detection, automated blocking tools, implementing safer account reset procedures, and elevating user awareness of social engineering attacks and scams providing avoidance advice. Routine reuse of the same and similar passwords and PINs should be prohibited or at least strongly discouraged.

Pioneered by Liberty Alliance and other players in the late 1990s and early 2000s, single-sign-on (SSO) solutions federate identity provisioning and access enabling users to be authenticated in a small number of places, or possibly at a single centralized location. Such approaches can significantly reduce the number of PINs and passwords required, however, they require users to be authenticated online at points of consolidation and centralization that must in turn be networked to achieve deployment on a wide-spread, potentially global scale. The consolidation points present attractive targets for various cyber-attacks.

The present invention promotes a distributed approach for identity acquisition and provisioning that promises to be highly scalable and avoids the above-cited weaknesses of password and PIN-based remote access schemes.

Fingerprint, facial, and iris recognition schemes are commercially viable for deployment on user platforms (e.g. PCs and smart phones). Ma reports the relative accuracy of available biometrics in terms of false positive rates with facial recognition at 43%, fingerprint at 30%, signature at 28%, voice at 20%, and iris recognition at only 0.47%. This helps explain the growing interest in iris biometrics.

User preferences for biometric schemes, matching accuracy, matching performance, human risks factors, and compatibility with the individual circumstances can vary widely, implying that solutions should offer users a range of biometric options for remote user authentication.

Meanwhile, emerging biometric signatures leveraging the body's venous, nervous and DNA systems are being studied by research institutions and can be expected to emerge over time. This observation suggests that biometric-based identity solutions should be extensible, accommodating add-on biometric technologies in a modular fashion as they emerge.

As users become better informed about the privacy risks posed by global networks, users are also becoming increasingly skeptical about systems that maintain biometric minutia and templates for biometric matching at consolidated and centralized locations. This suggests that biometric authentication schemes should de-centralize biometric capture and matching, putting such sensitive operations in the custody and control of users, that is, within their personal devices.

The inventive subject matter described herein advocates an authentication approach that consolidates biometric minutia (i.e. authentication data), regardless of the type of biometric, into a personal device controlled by the user which enables incorporating a range of biometric options that can be integrated in a modular fashion.

Multi-factor authentication technologies have been emerging and being increasingly advocated. Multiple authentication factors can be applied jointly to reduce the probability of failed authentication due to the compromise or fallibility of any given factor or factors. MFA typically addresses "What the user knows" (PIN, password, responses to questions), "What the user has or holds" (smart card, smart phone, FOB), and "What the user is" (iris, fingerprint, facial and other biometrics). Geo-location and behavioral authentication schemes are also factors that can be incorporated.

Extant solutions include 2-factor authentication schemes for banking that use a PIN and chip card (a smart card), hardware tokens that generate one-time-passwords (OTPs) for remote terminal logon, and smart phone solutions that integrate the text messaging channel of the phone to distribute OTPs to users when using a personal computer.

The inventive material herein accommodates MFA combining device custody, with local PIN/password authentication, and biometric options.

The prior art discloses public key infrastructure (PKI) and digital certificates an identity technology, introduced to automate the deployment of public-private encryption key pairs for secure communications, message transmission, and document safe-keeping. Digital certificates, conforming to the X.509 standard, include a public encryption key that is paired with a private key stored outside the context of the digital certificate. Tests can be performed to verify that a remote party holds the private key of a public key without having knowledge of the private key. PKI implements a hierarchical trust model wherein certificate authorities successively distribute digital certificates to dependent certificate authorities, Internet servers, and end-user devices. Digital certificates and their corresponding private keys are distributed by certificate authorities to other certificate authorities, to servers, and to end-user devices. Certificate authorities have the option of employing qualified human agents for $3^{rd}$ party identity proofing and verification.

The present invention improves upon the above features, overcoming the following deficiencies of PKI:
  (a) Using qualified independent certificate authorities, effective for verifying and tracking the identity of service providers, does not scale for human beings who outnumber servers by orders of magnitude;
  (b) Because public-private key pairs are generated by certificate authorities and subsequently distributed electronically, such key pairs could be vulnerable to compromise during distribution;
  (c) Because X.509 digital certificates only specify the certificate holder by a common name or identifier, identities of persons cannot be specified comprehensively for commercial and other such applications;
  (d) Digital certificates do not readily bind with other personal identifying information of an owner such as digital photographs or personal identifying information (e.g. passport, driver's license, certifications);
  (e) Although digital certificates enable relying parties to verify that the digital certificate owner has the private key that matches the public key of a digital certificate, PKI does not incorporate personal identifying information that reliably distinguishes the certificate owner from other users;
  (f) PKI does not provide assurances that the private key is strongly bound to the certificate owner;
  (g) PKI does not incorporate identity proofing and binding capabilities that provide objective evidence to relying parties that an independent party has attested to the identity of the digital certificate holder;
  (h) Because X.509 certificates are associated with a single public-private key pair, typically multi-purposed (e.g. used for digital signing, encryption, email, FTP, etc.), the risks of encryption key compromise are elevated over other approaches.

Finney et al. discloses Pretty Good Privacy (PGP) which was introduced to automate the deployment of public-private key pairs among persons (peer-to-peer) to secure communication channels, transmitted messages, and documents among PGP users. In contrast to PKI, PGP implements a web of trust model wherein individuals issue digital certificates to each other. An end-user, having installed the PGP software on their personal computer, creates an X.509 digital certificate containing a single public key with matching private key stored on the user's computer. PGP enables an informal process whereby a first user can send such a certificate to a second PGP user who digitally signs and returns the certificate to the first user. By retaining the single private key of a digital certificate within the owner's computing device, PGP reduces the risk of exposing and compromising this private key. This approach for creating and sharing digital certificates can be replicated among users with PGP software on their computing devices. PGP users can present one or more signed digital certificates to relying parties (users), elevating identity assurances when presented to other parties.

The present invention improves upon the above features, overcoming the following deficiencies of PGP:
  (a) Because X.509 digital certificates only specify the certificate holder by a common name or identifier, identities of persons cannot be specified comprehensively for commercial and other such applications;
  (b) Digital certificates do not readily bind with other personal identifying information of an owner such as digital photographs or personal identifying information (e.g. passport, driver's license, certifications);
  (c) Although digital certificates enable relying parties to verify that the digital certificate owner has the private key that matches the public key of a digital certificate, PGP does not incorporate personal identifying information that reliably distinguishes the certificate owner from other users;
  (d) PGP does not provide assurances that the private key is strongly bound to the certificate owner;
  (e) PGP does not incorporate a formal identity proofing process whereby relying parties are provided objective evidence of a user's identity;
  (f) Because X.509 certificates are associated with a single public-private key pair, typically multi-purposed (e.g. used for digital signing, encryption, email, FTP, etc.), the risks of encryption key compromise are elevated over other approaches.

Glossary of Relevant Terms

Identity: The present invention addresses only the identity of persons [i.e. human beings, individuals, users]. The identity of a person is comprised of selected characterizing attributes of the person that are attested to by one or more independent persons. The attributes of a person may include a combination of full legal name, commonly used names, pen names [pseudonyms], selected identifier(s), and various physical and non-physical attributes of the person. In the limit, the identity of a person is aggregated characterization of that person that distinguishes the person from all of other persons. In the future, DNA signatures could very well be used as identity attributes.

Identifiers: Identifiers are often confused with identity. An identifier, such as a social security number, a passport number, an email address or an employee number is an attribute of a person assigned by an agent of the government, a service provider, or an employer, and thereby contributes to a person's identity, but by itself does not constitute the person's identity.

Credential: A credential is a document held by a person that captures selected personal identifying information of the individual. A credential thereby partially represents the identity of the person. A person without any credentials or identifying documents has no documented identity and must rely on the attestations of other persons. An adult holding only a birth certificate, and no other credentials, would find it very difficult to conduct most day-to-day transactions. The attributes of a person are generally captured and specified by several credentials. The conjunction of all credentials held by a given person represents the total documented identity of the person. It is impractical and ill-advised to capture all of the attributes of a person in a single credential since disclosure or loss of such a comprehensive credential would compromise the entire identity of the person.

Credentialing: Credentialing is a process by which credentials, whether physical or electronic, are issued to individual persons. A person presents a credential to other persons when asserting their identity or presenting selected attributes of a credential. Credentialing is also known as identity provisioning.

Physical Credentials: Passports and driver's licenses are the most widely accepted physical credentials used to verify a given person's identity. A driver's license is an example of a physical card that specifies the holder's name, allocated license number, address, birthday, issue date, expiry date, and photograph. Issued by a state Departments of Motor Vehicles (DMV), such a physical credential also displays the issuer's jurisdiction plus watermarks and other technologies designed to detect and prevent credential tampering. Table 1 categorizes physical credentials in common use.

TABLE 1

Physical Credentials and Identifying Information (categorized)

| Life Event Credentials | Civil Credentials | Other Identifying Info |
| --- | --- | --- |
| Birth | Social Security Card | Utility Bill |
| Baptism | Global Entry/Nexus | Property Record |
| Marriage | Citizenship | Background Report |
| Divorce | Passport | Credit Report |
| Death | Immigration Status | Resume |
| | Voter Registration | Loan |
| | Work Authorization | Rental Agreement |
| | Driver's License | Mortgage |
| | | Photo |
| | | Tax Return |
| | | Payroll Record |
| Educational Credentials | Professional Credentials | Financial Credentials |
| Diplomas | Notary | Debit Card |
| Diplomas | Lawyer | Credit Card |
| Degrees | Engineer | Merchant Charge Card |
| Transcripts | Physician | |
| Certifications | Dentist | |
| | Architect | |
| | Accountant | |
| | Teacher/Professor | |
| | Certified Professional | |
| | Other Credentials | |
| | Business Card | |
| | Employee ID | |
| | Business Membership | |
| | Association Membership | |
| | Social Membership | |
| | Loyalty Card | |

Anti-fraud and Anti-copying: Ancient measures for protecting against fraud and tampering can be traced back to the use of wax seals and steganography. Wax seals were applied by monarchs to protect sensitive messages and official decrees. Equivalent techniques are still used by professional engineers, architects and notaries to seal drawings, physical credentials and other documents. The notary's process of applying seals to documents by means of an embossing device has been adapted to suit the needs of this invention.

Certified True Copies: To create a certified true copy of a physical credential such as a driver's license, a notary "proofs" a photocopy asserted to be a true copy of the driver's license by comparing the photocopy to the original driver's license, and verifying that they both match the person requesting the true copy. If satisfied, the notary applies a "true copy" declaration to the photocopy, and then uses an embosser to apply the notary's seal to the document. The applied seal identifies the notary, prevents others from tampering with the certified true copy including the "true copy" declaration, and thereby binds the notary's identity to the identity of the person specified in the copy. In prescribed circumstances, the certified true copy of an original driver's license can be used in lieu of the original for identification purposes, that is, the true copy is, in effect, a bona fide credential. Similarly, certified true copy translations (e.g. Spanish to English), and certified true copy photographs, can be proofed and sealed by a notary or a certified profession, for example, to support a person's application for a passport.

Physical Credentialing: Physical credentials have been generally issued by organizations, including governments, corporations, and financial institutions possessing the infrastructures and funding to issue fraud-resistant physical credentials. Smaller organizations including clubs, non-profits, affiliates, loyalty groups, and societies also issue physical credentials, albeit in simpler forms. In the final analysis, physical credential processing, including proofing and issuance, is performed by agents (individuals) who have been assigned to follow prescribed procedures of an identity provisioning institution. Credential proofing and issuing is, possibly, the most labor-intensive aspect of traditional physical credentialing systems.

Electronic Credentials: Electronic credentials, in the context of this inventive subject matter, are the digital equivalents of physical credentials. Electronic credentials are the electronic equivalents of passports, driver's licenses, banking cards, business cards, and all other such physical credentials (see Table 1), capturing and storing the names, identifiers, attributes, and photographs of individuals in software and electronic devices. Plastic credit and debit cards that capture the holder's name, an identifier, an expiry date, and possibly a photograph of the person within a magnetic strip or chip in the card (smart cards) are also are examples of electronic credentials. Software-based identities, "virtual identity cards", and electronic wallets" deployed on personal computers and in the "cloud" are also available. Relevant credentialing terms include:

Electronic Credentialing: Electronic credentialing is a process by which a credential issuer, an individual or an organization, collaborates with users to request, proof, and provision electronic credentials (e-credentials) to individuals. The requester submits a request for a new e-credential to the issuer; the issuer proofs the provided documents; and, when satisfied, issues an e-credential to the requester.

In-Person and Online E-Credentialing: Depending on the associated risks and the required level of identity and credential assurances, credentialing may involve a blend of in-person proofing and online proofing. In-person encounters will be appropriate to support large-value high-risk transaction flows. However, in-person encounters can be labor-intensive, less convenient, and less timely. Online proofing can be accomplished using audio and teleconferencing tools once a mutually trusted communications channel is established between the parties. The exposure risk of online identity proofing can be mitigated deploying multi-factor authentication between the user the system and using out-of-band techniques to exchange shared secrets.

Electronic Credential Issuing Modes: An e-credential is issued by at least one person, possibly even the credential holder themselves (a "self-issued" credential); by one or more independent issuers without relevant qualifications; by issuers who have personally known the requester for a given number of years; by issuers with ethical obligations levied by their professional oversight body; by issuers who occupy professions with specific relevant obligations to inspect and certify identifying documents with oversight; and by issuers with directly relevant qualifications and oversight to issue credentials of the type requested.

Assurances: For an electronic credentialing system to be effective it must be trusted to attest to identifying information, capture the information in the form of electronic credentials, and securely maintain and make credentials available for identity maintenance and verification throughout the useful lifetime of the credentials and the system itself. The levels of trust provided by such a system is dependent on the combination engineering tasks applied to achieve correctness, integrity, reliability, security, and quality of the system, its artifacts, and methods.

Identity Assurance: When communicating with a remotely located persons or services, collaborating parties need assurances as to the true identity of the parties. To support this requirement for persons [web services are beyond scope], the identifiers and attributes of a person (a subject), including legal, common, and pseudonyms, must be independently verified by independent persons known as issuers. The level of identity assurances achieved by the issuer depends on the extent the subject is known by the issuer (familiarity), and the relevant vetting and proofing competencies of the issuer. Relevant competencies for an issuer include proofing and vetting skills, objectivity, questioning skills, professional oversight by a governing body, and applicable code of conduct possibly sworn by oath—notary publics are exemplars. Identity assurances increase as the number of years that an issuer has personally known a subject, though not necessarily linearly. Identity assurance levels are also proportional to the above listed range of vetting and proofing competencies. Because objectivity and independence may conflict with familiarity, certain professionals, such as notaries and agents of credential issuing organizations, may be obliged to decline proofing and vetting a person who is too closely related to the issuer by way of family and employment.

Communications Assurance: The quality of communications when an issuer proofs the identity of a subject user has a significant impact on the efficacy of a credentialing system. Elevated levels of communications assurance can be achieved when the subject and issuer hold an in-person (face-to-face) encounter to exchange physical credentials and proof personally identifying documents. When a face-to-face encounter is not possible, identity proofing can be protected by establishing a mutually trusted communications channel between the parties using a shared secret exchanged out-of-band (over an alternate channel). For example, a shared pass-phrase could be exchanged over the telephone and a password-based scheme [2] generating a shared encryption key can be used to establish an encrypted session between the parties.

Credential Assurance: Credential assurance is directly dependent on identity assurance (familiarity and qualifications) and on the communication assurance (in-person encounters and trusted communication channels). However, credential assurance is separately proportional to the number of independent issuers proofing and attesting to a given credential. In other words, multiple proofing by independent issuers increases the level of credential assurance achieved. In addition, the relative binding strength between a credential issuer and a user receiving a credential elevates credential assurances. An issuer who is strongly bound to an issued credential will be challenged to repudiate having issued a credential to the subject and will therefore be proportionately motivated to thoroughly proof the identity of the subject. By the same token, relying parties, knowing that the issuer is strongly bound to credentials they issue, will be proportionately assured as to the relative assurance level of the subject's credential.

Authentication Assurance: Authentication assurances elevate the strength of bindings between a user and the local and remote services they use. Higher assurance levels for local authentication are achieved by employing multiple factors of authentication. Authentication factors include physical custody of the user's computing device plus knowledge-based, biometric-based and behavioral-based authentication schemes. Trustworthy remote authentication between a user's computing device and a remote server is generally accomplished by means of public-private keys derived from the user's locally stored credentials.

Software Assurance: The critical software components of an electronic credentialing system must be highly trusted and must also be protect by the operating system against malware, hacking and other attacks attempting to tamper-with, circumvent, or block the logic of the electronic credentialing system. Software assurance levels rise in proportion to the trustworthiness of the execution environment and the quality of the development effort (quality engineering, assurance, analysis, and testing). For example, a trusted execution environment capable of creating a "trust zone" within which the credentialing software executes will elevate software assurances.

Asymmetric key Encryption: Also known as public-private key encryption, algorithms that use two keys, a widely known public key and a private key known only to the owner. For example, the public key can be used to encrypt text that can only be decrypted by the paired private key. Alternately, the private key can be used to create a digital signature that can only be verified by the public key. RSA and Elliptical Curve (EC) are among the best known asymmetric key algorithms.

Authentication: User authentication is a security mechanism for binding a user to a controlled resource by validating the identity of the user, for example, through a logon process (e.g. account/PIN, and identifier/password pairs), and/or through a biometric matching process. Message authentication is a process for establishing the validity of a transmission, for example, through a cryptographically generated message authentication code attached to the message. Message origination authentication can be performed by using a private key of the originator to create a digital signature over the message which is verified by the recipient using the paired public key.

Biometric Minutia: In biometrics and forensic science, minutiae are enrolled features of a biometric, for example, a fingerprint scan, an iris scan, and a facial scan, that are used to algorithmically match future scans of an individual's biometric to authenticate the individual.

Cryptography/Encryption: A discipline of mathematics and computer science concerned with information security including algorithms that translate data and text into secret code strings known a cipher text.

Cryptographic: An adjective used to characterize encryption, digital signing, and digital sealing processes.

Crypto-logical Binding: Coined herein to characterize the binding between pairs of public-private keys wherein encryption by one key yields a result that can only be decrypted by the other key.

Digital Sealing: A cryptographic method defined herein that uses a private key of the issuer to bind the issuer's identity and a declaration of the issuer to a document or message such that the issuer cannot repudiate having applied the digital seal. The paired public key can be used to verify the digital seal.

Identity Binding: As used herein, binding an individual to their identity by way of custody of a device or devices (personal identity device and removable protected memory), user authentication to the user's device (control of authentication data), logical binding to the user's identity (identity engine encapsulating e-credentials of owner), and third party attestation by way of identity proofing and digital sealing of a declaration that cannot be repudiated.

Information Security: The protection of information to ensure confidentiality, integrity, and availability.

Issuer (payment card definition): An entity that issues payment cards or performs, facilitates, or supports issuing services including but not limited to issuing banks and issuing processors.

Hashing: a one-way mathematical function in which a non-secret algorithm takes any arbitrary length message as input and produces a fixed length output usually called a "message digest".

Non-Repudiation: A state of affairs where a purported declaration by an individual cannot be successfully challenged, for example, when the authenticity of a signature applied to a contract is challenged.

PIN: Personal Identification Number.

Protected Memory Store: A memory that is, or can be, isolated from the primary working memory of a device such that this memory can only be accessed by a designated module (e.g. the "identity engine" herein).

Multifactor Authentication (MFA): Typically characterized by authentication factors based on (a) "what you know", (b) "what you have" and (c) "what you are", where factor (c) can be a biometric authentication factor or a behavioral authentication factor. Geo-location is also considered an authentication factor in certain contexts.

Out-Of-Band (OOB): A parallel channel to the primary information access channel. For example, when the primary session is a web session to a service provider, text messaging, voice, courier, and fax communications are considered out-of-band.

Personal Identifying Information (a.k.a. Personally Identifying Information): Information that can be utilized to identify or trace an individual's identity including but not limited to name, address, social security number, biometric data, date of birth, etc.

Sniffing: A technique that passively monitors messages over networks and channels for the purpose of collecting sensitive user information and intelligence including user accounts and passwords.

Symmetric Key Encryption: Algorithms that use the same encryption key to both encrypt and decrypt text and data (e.g. AES).

User Persistence: A condition that can be verified by performing a test that verifies that the same user is present (i.e. "is using") at a remotely located device wherein the identity of the remote user need not be known.

SUMMARY

A novel system of electronic artifacts and methods for specifying, issuing, and using electronic identities is described. This system mimics physical credentialing systems, the aim being to offer an elevated assurance identity solution that will be readily adopted by citizens, consumers and enterprise users. The present invention overcomes the shortcomings of traditional password-based and digital certificate based identity systems. The present invention specifies a system for individual persons, as well as agents associated with identity services, to issue identities to other persons such that these identities can be employed by their owners to unambiguously identify themselves over information networks.

The present invention provides strong assurances to a relying party, namely to a user or to a service, that the collaborating remote user is strongly bound to their personal identity device and identities contained therein and thereby persistently present; that the identity presented by the collaborating remote user originated from that user, and no other user; that the identity presented by the remote user was attested to by at least one $3^{rd}$ party user; that such $3^{rd}$ party users cannot repudiate having attested to the identity provided to the remote user; that by means of the identity provided by the remote user, information sent to the remote party can only be read by that remote party, and no other parties; and that by means of the identity provided by the remote party, the relying party can verify that information received from the remote user, must have originated from that user, and no other user.

Unanticipated Discovery: By means of the identity of a user and a digital sealing method, a notarization-like procedure, the user can digitally seal a declaration to an electronic document, including an electronic identity, such that the user cannot repudiate having applied the digital seal to the declaration and the document.

The present invention specifies identity artifacts and methods that can be applied to adapt prior art personally held devices including smart phones, tablet PCs, laptops and personal computers for the purpose of identity acquisition, holding, issuance and usage. The sections below systematically explain how the new artifacts and methods of this innovation have been combined with prior art technologies to yield a new approach for electronic identity and credentialing. Context, practical pre-conditions, and relevant assumptions are also articulated. An ordinary person skilled in the art could not have discovered the inventive material through traditional design effort or happenstance.

Herein, an identity of a user is specified in the form of an electronic credential (e-credential) containing fragments of the e-credential owner's personal identifying information.

This innovation specifically avoids the weaknesses of remote password/PIN based authentication schemes wherein such user secrets are vulnerable to being discovered and "cracked". It also offers a solution that avoids the risks of e-credentials being stolen from network repositories for fraudulent purposes.

The present invention overcomes these weaknesses and risks, creating an identity system where:

(A) E-credentials of the owner can only be used by that owner to perform privileged operations, and (B) An owner's e-credential cannot be employed by other users to masquerade as the e-credential owner.

By way of this invention, users control their e-credentials and secrets, acquire identities from one another, and use their e-credentials and associated secrets to enable secure information access and sharing with other users and information services:
  (i) Messages originated under the e-credential of an owner cannot be repudiated by that owner;
  (ii) Messages received under the e-credential of the owner can only be read by that owner
  (iii) Documents digitally sealed under the e-credential of the owner cannot be repudiated by that owner.

The present invention leverages identified prior art, combining selected features with new artifacts and methods.

This invention leverages prior art authentication schemes. It is assumed that the personal identity device of the user (the owner) has pre-installed authentication hardware and software mechanisms executing local PIN/password, biometric and/or other authentication schemes wherein authentication data (e.g. PIN/password hashes and finger print, iris, and facial recognition minutia) are retained within the personal identity device. Authentication factors, possibly combined (i.e. multi-factor authentication schemes), thereby persistently bind the user to their personal identity device and the e-credentials (identities) contained therein.

This innovation also leverages prior art public-private encryption key technology which enables a remote party to verify that an e-credential provided by an owner is in the custody (possession) of that owner. Public-private encryption technology associated with a selected e-credential is also used to perform digital signing, encryption and digital sealing operations that are bound to the e-credential owner by means of prior art public-private encryption technology.

The present invention introduces a novel method called "digital sealing" which adapts prior art digital signing technology. A digital seal applied under an e-credential of an owner, cryptographically binds a declaration of the owner to a selected document such that the owner cannot repudiate having applied the declaration to the document.

Specific limitations of legacy identity systems are overcome by:
  (a) Enabling the owner of a personal identity device to use that device to hold identities that are comprehensively specified in the form of electronic credentials ("e-credentials");
  (b) Leveraging pre-installed authentication mechanisms and related authentication data to persistently bind the device owner to e-credentials and secrets of the owner contained therein;
  (c) Binding public-private keys to e-credentials of an owner to enable remote users to verify that an e-credential provided by the originating owner is in the owner's possession, and that subsequent digital signing, encryption, and digital sealing operations are bound to that owner;
  (d) Specifying an identity proofing, attestation and digital sealing procedure whereby an e-credential issuer (a user) collaborating with an e-credential requester (another user), binds personal identifying information of the requester to an e-credential of the requester such that the issuer cannot repudiate having attested to the requester's identity specified by that e-credential.
  (e) Enabling multiple users to proof, attest to, digitally seal, and issue a given e-credential thereby elevating identity assurances for relying parties who can inspect and verify at least one, and possibly all, digital seals applied to the e-credential of the owner.
  (f) Enabling relying parties to inspect the e-credentials of each user having applied a digital seal, including the e-credentials of any, and possibly all, antecedent users having applied a digital seal, to achieve elevated assurances for high value transactions.

These capabilities combine to provide elevated assurances to collaborating parties that the remote party is persistently bound to any e-credential they provide, that the parties are thereby strongly bound to each other over persistent, secure communications channels, and that the provided e-credential unambiguously contains selected identifying information of the collaborating remote party.

The present invention assumes users have prior art smart phones, tablet PCs, laptops, and other such personal computing devices, that these devices have user interface(s), communications interfaces (e.g. Internet, cellular, NFC, Bluetooth), a native operating system, an authentication component, likely digital camera(s), possibly built-in hardware and/or software cryptographic libraries, and possibly a removable protected memory store such as an SD card, USB flash memory, or a smart card. The authentication component may support multiple user authentication mechanisms. It is assumed that the operating system is capable of preventing, detecting, and quarantining malware and remote hacking attempts thereby isolating the artifacts and methods of the present invention from active and passive tampering. Finally, it is assumed that the user's device and software may have pre-determined identifiers and that the artifacts and methods of this invention are pre-installed.

The key artifacts of the present invention include personal identity devices of users (owners), each device having an identity engine for holding and managing electronic identities and secrets of the device owner as well as the identities of other device users. The identity engine specifies electronic identities of the device owner by capturing selected identifying information of the user which the identity engine embeds into newly created "electronic credentials" (e-credentials) encapsulated by the identity engine. The user's identifying information is captured by means of user interface(s) including digital camera(s) if present. The camera(s) can be used, for example, to take self-photographs, and photographs of the other identifying information of the user (e.g. certificates, licenses, driver's license). The identity engine captures the e-credentials of others users by requesting them from collaborating users over information networks and/or by acquiring them from remote identity repositories.

Secrets of a device owner such as authentication data (e.g. PIN/password hashes, biometric templates, and behavioral criteria), and private encryption keys, are retained in a protected memory store such that the secrets can only be accessed and used by the identity engine and are not disclosed by the identity engine. When such a protected memory store is physically removable from the owner's device, and can be re-attached, it is called an "ignition key".

Combining Distinguishing Features Yields Remarkable Capabilities

The distinguishing features of the present invention are combined to yield the following remarkable capabilities:
(a) The identity engine of the owner's personal identity device controls a protected memory store containing the owner's authentication data. Once authenticated, the user is thereby persistently bound to the identity engine including contained e-credentials and three (3) public-private keys associated with each e-credential. The private keys are also maintained within the protected memory store. If the protected memory store is removable, the identity engine can be disabled by removing the memory restore.

(b) By way of (a), e-credentials maintained within the identity engine of an owner's device can be exchanged and used to establish persistent, secure sessions between collaborating users. Using their respective e-credentials and associated public-private key pairs, e-credential owners can exchange messages that have been digitally signed by the sender and encrypted for the recipient. Owners can also use their e-credentials and associated keys to digitally seal and inspect (verify) documents and messages. Although these mechanisms ensure that owners are strongly bound to their e-credentials, collaborating users cannot be certain that the identifying information embedded in the e-credential provided by the other party actually represents the identity of the other user.

(c) Having established a persistent, secure session by way of (b), one user (the issuer) can proof and attest to the identity of another user (the requester), digitally seal the requester's e-credential, issue the credential to the requester, and thereby provide the requester with an attested to e-credential that the issuer cannot repudiate. Such a requesting user can subsequently use such digitally sealed e-credentials to provide elevated identity assurances to other parties. Such proofed and attested to e-credentials can also be used to affix digital seals, including declarations, to electronic documents, including e-credentials and message, that cannot be repudiated by a user applying a digital seal.

In summary, the present invention yields the following remarkable capabilities: Collaborating parties are provided assurances that a personal identity device owner is persistently bound to their device including the digitally sealed and issued e-credentials of the owner and the associated encryption keys; that an e-credential, proofed, attested to, and digitally sealed by a personal identity device owner to another user, cannot be repudiated by that owner; that the originator of messages and documents under the originator's e-credential cannot repudiate having sent them; that the user owning a given credential will be the sole party capable of receiving messages employing that e-credential; and that a personal identity device owner applying one of their e-credentials to digitally seal an electronic document or message, possibly including a declaration of the owner, cannot repudiate having applied their digital seal and declaration to the document or message.

Summary of Benefits

This electronic identity and credentialing system prevents a wide-range of electronic fraud vulnerabilities, mitigating the risks of identity theft, loss and abuse. The system has been created to support the needs of individual persons to control their identities as well as the needs of enterprises to unambiguously identify consumers, employees, citizens, and other users.

This invention specifically satisfies the compelling need for an electronic identity and credentialing system that mimics traditional identities and credentialing in the physical world, and avoids the vulnerabilities and risks of legacy identity systems. The present invention achieves this objective, creating high assurance identities for and among individual persons in the form of electronic credentials (e-credentials) bound to e-credential holders.

This electronic identity and credentialing system, by means of an identity engine operable within a personal identity device, strongly binds identifying information of the individual to their electronic credentials which they can subsequently use to unambiguously represent themselves to others over information networks while using their smart phone, tablet computer, laptop computer, or personal computer.

Contemplated embodiments described herein integrate smart cards, smart rings, smart watches and smart glasses to elevate identity assurances for citizens and consumers as such enabling technologies emerge.

LIST OF REFERENCE CHARACTERS 100 electronic identity and credentialing system
101 users with personal identity devices
102 smart phone
103 tablet computer
104 laptop computer
105 service providers
106 identity services
107 transactions between users and service providers
108 transactions between users and identity providers
109 e-credential requesting user (a requester)
110 personal identifying information
111 e-credential request
112 e-credential issuing user (an issuer)
113 issued e-credential
114 mutually trusted channel
115 if agent, sends e-credential copy to identity provider
116 identity service
120 personal computer
200 personal identity device and identity bindings
201 owner (a user)
202 personal identity device
203 personal identifying information in custody of owner
204 identity engine
205 custody of device in custody of owner 201
206 user interface
207 camera
208 photographing owner
209 photographing personal identifying information
210 knowledge-based binding (e.g. password, PIN)
211 biometric module
212 personal identifying information in custody of owner 201
213 protected memory store (ignition key)
214 custody of ignition key (removable protected memory store)
215 biometric binding
216 logical binding between user interface 206 and authentication data 226
217 logical binding between biometric module 211 and authentication data 226
218 crypto-logical bindings between public and private keys associated with e-credentials of owner 220
219 authentication control
220 e-credentials of the owner
225 public keys embedded in e-credentials of owner
226 authentication data
227 private keys of e-credential of owner 220
230 e-credentials of other users
235 public keys embedded in e-credentials of other users
240 communications interface
245 documents and messages in a personal identity device
260 device identifier
265 identity engine identifier
270 legend: identity bindings
275 legend: public-private encryption keys
290 other users (issuers) with e-credentials 291 digital seals affixed to e-credentials by other users
292 digital seal affixed to a document by another user
293 cryptographic bindings between issuers 290 and e-credentials of owner 220 and a document 245 by way of digital seals
294 digital seals affixed to e-credentials of other users
295 digital seal applied to a document using an e-credential of the owner 220
296 cryptographic binding by way of a digital seal affixed to a document using an e-credential of the owner 220
300 collaboration among users with personal identity devices
301 user (requester)
302 user (issuer)
303 user has an e-credential issued by another party
390 collaborating users can establish persistent secure sessions by exchanging e-credentials and using the encryption key pairs associated with their e-credentials
392 an issuer 302 attests to the identity of a requester 301 wherein the issuer cannot repudiate having proofed the requester's identity
394 users can use e-credentials proofed and attested to by other parties to establish secure sessions—user 301 provides user 303 an e-credential issued by user 302, while user 303 provides user 301 an e-credential issued by a different party
400 electronic credentials and relationships
401 e-credential of an owner (a user)
402 default e-credential
403 e-credentials of issuers
404 e-credentials of other users
405 personal identifying information
406 digital seals created using e-credentials of issuers
407 digital seals affixed to e-credential 401
408 e-credential of owner 401 used to issue e-credentials to other users
409 digital seals affixed to e-credentials of other users
410 self-sealed default e-credential
411 e-credential attributes
412 owner attributes of the e-credential owner
413 each digital seal associated with e-credential issuing record
414 e-credential issuing record
423 digital sealing image
416 three (s) public-private encryption key pairs
417 public keys (3) embedded into e-credential 401
418 private keys (3) in protected memory store 213
440 attributes of e-credential attested by issuer
441 attributes of e-credential conferred by issuer
442 sign/verify documents and messages
443 encrypt/decrypt documents and messages
444 embossing key used to create digital seals
445 inspection key used to verify digital seals
450 credential template (an empty unsealed electronic credential)
500 Method for handling digital seals
501 an electronic artifact (e.g. document, message, e-credential)
503 electronic artifact identifier
505 binding between digital seal and electronic artifact using the identifier of the artifact
510 attestation of an e-credential owner
512 issue date of digital seal (possibly including time)
517 e-credential identifier
519 affixing a digital seal
520 inspecting a digital seal
521 e-credential of the owner
522 pre-determined identifying attributes of e-credential
523 digital sealing image
524 inspection key (i)
525 embossing key (c)
526 pre-determined elements of electronic artifact
528 digital seal
529 digest
530 hash digest function
531 hashed digest
532 emboss function
533 digital seal signature
534 affix function
540 extract function
541 inspect function
542 hash result function
543 compare function
544 result
545 hashed result
546 expected hash
547 "digital seal verified"
548 "digital seal failed to verify"
600 issuing true copy e-credential of a physical credential
601 e-credential requester
602 requester takes a photograph of a physical credential
603 photograph of physical credential
604 physical credential
605 e-credential request
606 mutually trusted channel established
607 e-credential issuer
608 identity proofing
609 true copy e-credential
610 transaction record
611 e-credential registry
700 issuing true copy self-photograph e-credential
701 e-credential requester
702 requester takes self-photograph
703 e-credential request
704 self-photograph
705 mutually trusted channel established
706 e-credential issuer
707 identity proofing
709 true copy self-photograph e-credential
710 transaction record
711 e-credential registry
800 issuing an original e-credential
801 e-credential requester
802 e-credential request
803 mutually trusted channel established
804 e-credential issuer
805 identity proofing
806 physical credentials
807 e-credential registry
808 digital photograph
809 issued e-credential
811 transaction record
900 alternate embodiments
901 smart phone
902 tablet computer
903 laptop computer
904 personal computer
905 smart card
906 smart ring
907 smart watch
908 smart glasses
909 e-credentials of the user including public keys
910 mutually trusted channel established
911 protected memory store 912 private keys and secrets
920 user
1000 potential scope of electronic credential usage
1001 user holding a personal identity device
1002 representative e-credential issuing users holding personal identity devices
1003 true copy photograph
1004 true copy driver's license
1005 diploma
1006 employee identifier
1007 driver's license
1008 social security number
1009 citizenship
1010 passport
1011 healthcare card
1012 debit card
1013 credit card
1020 friend, family member, colleague, co-worker
1021 professional network, social network, professional affiliation, non-profit association
1022 notary public, teacher, professor, physician, dentist, certified professional
1023 educational institutions
1024 employers, enterprises, businesses
1025 departments of motor vehicles
1026 federal and state institutions
1027 financial institutions and banks
1028 healthcare providers and insurers
1029 e-business merchants and suppliers
1100 relating physical credentialing, PKI, PGP and e-credentialing system
11A: Physical Credentialing
1101 identifying attributes
1102 physical credentials
1103 other personal identifying information
1104 user
1105 physical credential
1106 agents
1107 credential request
1108 agent issues physical credential
1109 writes credential and transaction record
1110 credential registry
11B: Public Key Infrastructure (PKI)
1120 certificate authority (C)
1121 signed [digital] certificate, name=C
1122 root certificate authority
1123 certificate request
1124 user X
1125 signed digital certificate, name=X
1126 signed digital certificate issued
11C: Pretty Good Privacy (PGP)
1140 user A
1141 user B
1142 unsigned digital certificate, name=A (associated with private key)
1143 unsigned digital certificate, name=B (associated with private key)
1144 unsigned digital certificate, name=A (disassociated from private key)
1145 signed digital certificate, name=A
1146 private key associated with public key of signed certificate
1147 signed digital certificate, name=A (associated with private key
11D: Electronic Identity and Credentialing System
1160 user A
1161 user B
1162 user C
1163 personal identity device
1164 personal identity device
1165 personal identity device
1166 first step of round-robin issuing process
1167 second step of round-robin issuing process
1168 third step of round-robin issuing process
1169 default credential, name=default
1170 e-credential request, name=A (associated with private keys)
1171 default e-credential embossing key digitally seals request
1172 e-credential request, name=A (disassociated from private keys which are thereby not revealed)
1173 sealed e-credential, name=A (sealed by user A and user B)
1174 newly issued e-credential
1175 digital seal of user B applied
1176 digital seal of user C applied
1177 embossing key of selected credential digitally seals issued e-credential (e.g. default e-credential)

BRIEF DESCRIPTION OF DRAWINGS

The following figures show embodiments according to the inventive subject matter, unless noted as showing prior art.

FIG. 1 is a system diagram depicting users holding personal identity devices, communicating with identity services and service providers, and relationships between users, personal identifying information, and electronic credentials.

FIG. 2 is a diagram depicting an owner's personal identity device including personal identifying information, pre-installed identity engine, e-credentials retained within the identity engine, a protected memory store, known as an ignition key if removable, other users of personal identity devices, identity services, service providers, and various physical, knowledge-based, biometric, logical, and cryptological bindings among the artifacts comprising a personal identity device, as well as bindings with other users of personal identity devices.

FIG. 3 is a diagram depicting collaboration among users requesting, issuing, holding and using e-credentials.

FIG. 4 is a diagram depicting electronic credentials of users (e-credential owners), including attached personal identifying information, a default e-credential, and an e-credential template, the figure also depicting relationships between e-credentials of issuers and an e-credential owner, and e-credentials issued by an e-credential owner to other users of personal identity devices.

FIG. 5 is a diagram depicting Method for Handling Digital Seals.

FIG. 6 is a usage scenario diagram illustrating the creating of an e-credential with an attached photocopy of the physical credential thereby issuing of a true copy of a physical credential.

FIG. 7 is a usage scenario diagram illustrating the creating of an e-credential with an attached self-photograph, thereby issuing of a true copy of a self-photograph, and possibly creating an electronic business card.

FIG. 8 is a usage scenario diagram illustrating the issuing of an original electronic credential, for example, an electronic driver's license or banking card embedded in the user's personal identity device.

FIG. 9 depicts alternate embodiments of the electronic credentialing system that can be expected to emerge in the future.

FIG. 10 depicts the potential scope of applications and services that could benefit from deployments of the electronic identity and credentialing system in various economic sectors.

FIG. 11 relates physical credentialing, Public Key Infrastructure, Pretty Good Privacy (PGP), to the electronic identity and credentialing system.

DETAILED DESCRIPTION

Representative embodiments according to the inventive subject matter are shown in FIGS. 1 to 11, wherein similar features share common reference numerals. The specific embodiments are meant to be illustrative and not limit the scope of the invention and the various ways it may be embodied.

The inventive subject matter is an electronic credentialing system which includes personal identity devices of users [persons] capable of requesting and issuing electronic credentials, as well as exchanging electronic credentials over the web with identity services and service providers. A personal identity device is an adapted mobile computing device such as a smart phone, a tablet computer, a laptop computer, or personal computer with a pre-installed identity engine and a protected memory store. Users have physical credentials in their custody, and electronic credentials (e-credentials) maintained within the identity engine of their personal identity device(s). The protected memory store contains secrets including PINs, passwords, and passphrases of the device owner. An embodiment of a personal identity device could include a trusted execution environment to establish a trust zone to shield the identity engine and protected memory store from un-trusted software components.

A requesting user can submit an e-credential request to another user, the issuer, who proofs personal identifying information provided by the requester, digitally seals the e-credential including a declaration of the issuer, and returns the digitally sealed e-credential to the requester. Acquiring an attested to e-credential requires a requester to arrange an encounter [a session or meeting], or possibly a series of encounters, with issuer(s) to vet the requester by proofing their personal identifying information, for example, by matching the requester to the photograph and signature on their driver's license, and by asking probing questions to ferret out imposters. An in-person encounter is said to be one where the identity of the requester is proofed by the issuer face-to-face, typically in a private area. Online identity proofing can be conducted, for example, by way of audio-video conferencing (e.g. Skype) or telephone, wherein personal identifying information is submitted electronically. Online identity proofing appears to be more vulnerable to electronic fraud than in-person proofing. However, this disadvantage is mitigated when the requester is well-known by the issuer and the online encounter is conducted over a mutually trusted communications channel.

During operational use, users of personal identity devices can use them to collaborate with other device users as well as with identity services and service providers. E-credentials obtained from other users are retained by the identity engines. FIG. 1 Depicting Scope of Electronic Identity and Credentialing System Now referring to FIG. 1, which depicts the electronic identity and credentialing system 100 including users with personal identity devices 101 including smart phones 102, tablet computers 103, laptop computers 104, and personal computers 120. FIG. 1 also depicts service providers 105 and identity services 106, transaction flows between users and service providers 107, and transactions between users and identity services 108. Additionally, the figure illustrates an e-credential (electronic credential) requesting user 109 (a requester), holding personal identifying information 110, submitting an e-credential request 111 to an e-credential issuing user 112 (an issuer), who issues an e-credential 113 to the requester 109 by way of their smart phones 102. If the issuer is an agent of an identity service 116, the issuing agent sends a copy 115 of the issued electronic credential 113 to identity service 116.

Now referring to FIG. 2, this diagram depicts a personal identity device and identity bindings 200 composing the system. Legend 270 of FIG. 2 depicts five (5) types of bindings: physical, knowledge-based, biometric, logical, and cryptographic (crypto-logical) bindings. The identity bindings among artifacts of the system provide assurances that e-credentials of the owner are strongly bound to the identity owner, and not to any other owner.

FIG. 2 depicts an owner 201 (a user), personal identity device 202 of the owner, personal identifying information 203 (e.g. utility bills, certificates, driver's licenses) in the custody 212 of owner 201, and communications interface 240 to other users with personal identity devices 101, to remote identity services 106, and to remote service providers 105. Personal identity device 202 is bound to the device owner 201 by way of physical custody 205 and authentication bindings 210 and 215 protecting against possible loss of custody 205. A personal identity device 202 also contains documents and messages 245. This figure additionally shows other users (issuers) 290 with e-credentials having affixed digital seals 291 to e-credentials 220 of the owner and digital seal 292 affixed to a document or message 245.

A personal identity device 202 has an identity engine 204 that holds e-credentials (electronic credentials) of the owner 220 and e-credentials of other users 230. Identity engine 204 controls a protected memory store 213 and possibly has a digital camera 207. Identity engine 204 specifies an e-credential of the owner 220 specified by owner 201 entering personal identifying information 203 captured 210 by way of user interface 206, by attaching self-photographs 208, and by attaching photographs 209 of the owner's personal identifying information 203. Certain embodiments may have a device identifier 260 and an identity engine identifier 265.

User interface 206 is also capable of performing knowledge-based authentication and storing knowledge-based authentication data 226, including PINs, passwords and PIN/password hashes, in the protected memory store 213. The personal identity device 202 possibly has a biometric module 211 performing biometric authentication, storing biometric authentication data 226, including finger print, iris, facial and other biometric minutia, in protected memory store 213. Authentication data 226 stored in protected memory store 213 is controlled (encapsulated) by identity engine 204.

By encapsulating the authentication data, the identity engine 204 logically binds the device owner 201 to the owner's e-credentials 220 controlled by identity engine 204:

(a) Identity engine 204 implements logical binding 216 to bind the device owner 201, via user interface 206, to the associated knowledge-based authentication data 226 in protected memory store 213. Owner 201 is thereby logically bound to their personal identity device 202, as well as by means of physical custody 205.

(b) If personal identity device 202 has a biometric module 211 biometrically binding owners 201 to biometric module 211 and hence to personal identity device 202, identity engine 204 can employ logical binding 217 to bind biometric module 211 to associated biometric authentication data 226 in protected memory store 213. Owner 201 is thereby additionally bound to device 202 and identity engine 204.

(c) To detect possible loss of custody 205, identity engine 204 can use authentication control 219 to cause user interface 206 and biometric module 211 to re-authenticate the user thereby verifying that device owner 201 is persistently in control of their personal identity device 202.

If protected memory store 213 can be removed by device owner 201, owner 201 can physically break logical binding 216 thereby disabling authentication by means of user interface 206 and biometric module 211, disabling identity engine 204 and thereby preventing other users from masquerading as personal identity device owner 201. Owner 201 can subsequently re-enable their identity engine 204 by re-attaching protected memory store 213. When a removable memory store 213 is removable, it is called an "ignition key".

Associated with an e-credential of the owner 220 are three (3) public-private encryption key pairs, the pairs being crypto-logically bound 218 (see glossary) to each other, where the three (3) public keys 225 of each pair are embedded in the e-credential 220 of the owner, and the corresponding three (3) private keys 227 of each pair are embedded into removable memory store 213 controlled by identity engine 204. Legend 275 identifies the six (6) types (3 pairs) of public-private encryption keys associated with an e-credential. If protected memory store 213 is removable (is an "ignition key"), public-private key crypto-logical bindings 218 are broken when ignition key 213 is removed thereby disabling identity engine 204 and enabling owner 201 to have custody 214 of protected memory store 213 including contained secrets of owner 201, namely, authentication data 226 and private encryption keys 227.

By way of communications interface 240, identity engine 204 can provision e-credentials of the device owner 220 to other users 101, to identity services 106, and to service providers 105. When so provisioned, public keys 225 embedded in an e-credential of the owner 220 are available to other collaborating parties (users and services). The paired private keys 227 within protected memory store 213 are not revealed by the identity engine 204 of the owner to other users.

By way of communications interface 240, identity engine 204 can acquire e-credentials of other users 230, and from identity services 106. E-credentials of other users 230 have embedded public encryption keys 235. However, the private keys paired with public keys 235 are not disclosed by the personal identity devices 202 and contained identity engines 204 of other users 101.

Cryptographic operations, associated with the encryption keys of a selected e-credential 220 of an owner provided to other parties, are bound to device owner 201 as follows (see legend 275):

(a) Digital signing key s, a private key in 213 associated with e-credential 220 of the owner, can be used by identity engine 204 of owner 201 to calculate, by means of a prior art encryption algorithm, a digital signature over a message, document or e-credential. Because 216 and 217 logically bind s to owner 201, and because s is crypto-logically bound 218 to verification key v, a public key 225 embedded in e-credential 220, other parties having 220 can use verification key v to verify that the digital signature applied to the message, document or e-credential must have been originated by owner 201;

(b) Encryption key e, a public key embedded in e-credential 220 provided by owner 201, can be used by other parties, by means of a prior art encryption algorithm, to encrypt messages and documents sent to owner 201. Because the matching decryption key d, a private key 227 in 213, is logically bound by 216 and 217 to owner 201, and d is crypto-logically bound 218 to e, other parties having e-credential 220 can use e to encrypt electronic credentials, documents and messages that can only be decrypted by owner 201 thereby providing assurances that only owner 201 can read them;

(c) Embossing key £, a private key in 213 associated with the e-credential of owner 201, can be used by the owner, by means of the present invention's digital sealing embossing and inspecting method (see FIG. 5), to calculate and render a digital seal, and affix a digital seal (291, 292, 294, 295) to an electronic credential, document or message. Because 216 and 217 logically bind £ to owner 201, and because £ is crypto-logically bound 218 to inspection key i (a public key 225 embedded in e-credential 220), other parties having e-credential 220 can use inspection key i to verify that the digital seal applied to the message, document or e-credential must have been created and affixed by owner 201.

FIG. 2 also illustrates other users 290, having personal identity devices and e-credentials, respectively affixing digital seals 291 and 292 to e-credentials 220 and an electronic document 245, thereby creating cryptographic bindings between the e-credentials of other users (issuers) 290 and e-credentials 220 of the owner, and documents and messages 245 contained in personal identity device 202 of owner 201. Described further in FIGS. 3, 4 and 5, a digital seal, by means of the embossing key £ of an e-credential of an owner, crypto-logically binds the identity of the owner, including an attestation (a declaration) specified by the owner, to an electronic artifact such that the owner cannot repudiate having affixed the digital seal to the attestation (declaration) and electronic artifact. Other parties can use the paired inspection key i of the e-credential to verify the digital seal. When another user 290 selects one of their e-credentials to create a digital seal, affixing the digital seal to an e-credential 220 of owner 201, the non-repudiation property of the affixed digital seal provides elevated assurances to other parties that the personal identifying information specified by e-credential 220 is that of owner 201, and not of some other e-credential owner.

Now referring to FIG. 3, this figure depicts collaboration among users with personal identity devices 300. FIG. 3 depicts three (3) personal identity devices of FIG. 2 collaborating with each other.

1) FIG. 3 depicts scenarios wherein three users 301, 302 and 303, have personal identity devices 202 with pre-installed identity engine 204, each user 301, 302 and 303 respectively having e-credentials $EC_n$, n=1, 2, 3 wherein $EC_n$, has embedded public keys $v_n$, $e_n$ and $i_n$ respectively paired with private keys $s_n$, $d_n$ and $\epsilon_n$ retained in protected memory store 213. E-credentials, $EC_n$, n=1, 2, 3 are possibly digitally sealed.

2) During any given collaboration session, the identity engine of user 301 can request the identity engine of user 302 to re-authenticate user 302 by means of authentication control 219, returning a confirmation message to user 301 verifying that user 302 is persistently connected to the personal identity engine 204 of user 302.

3) Using their identity engines 204, users 301 and 302 establish a persistent secure session 390 as follows:

a) Users 301 and 302 digitally sign $EC_1$ and $EC_2$ using $s_1$ and $s_2$ respectively, and exchange these signed e-credentials.

b) Users 301 and 302 respectively apply $v_1$ and $v_2$ embedded in $EC_2$ and $EC_1$ to verify the digital signatures applied to each e-credential.

c) If the digital signatures applied to $EC_1$ and $EC_2$ successfully verify under $v_1$ and $v_2$, users 301 and 302 can respectively apply $e_2$ of $EC_2$ and $e_1$ of $EC_1$ to encrypt messages sent to the other user, user 302 employing $d_2$ of $EC_2$ and user 301 using $d_1$ of $EC_1$ to decrypt received messages from users 301 and 302 respectively.

d) Having executed 3) a), b) and c), users 301 and 302 have assurances that they are persistently bound to each other and are communicating over a secure channel. However, neither user can be certain that the identifying information specified in the credential provided by the other user actually represents that user, that is, the risk of user masquerade has not been eliminated.

4) E-credential issuer 302 attests to the identity of e-credential requester 301 over a persistent secure session 392. Users 301 and 302 use their identity engines 204, executing step 3 above, to exchange e-credentials $EC_1$ and $EC_2$, thereby establishing a persistent secure session 390. User 301 (the requester) acquires a digitally sealed e-credential from user 302 (the issuer) as follows:

a) In addition to $EC_1$, requester 301 provides personal identifying information 203 to issuer 302. $EC_1$ may be unsealed or previously sealed with one or more (multiple) digital seals affixed.

b) Issuer 302 proofs requester 301 against the provided personal identifying information 203 and the contents of $EC_1$, possibly asking probing questions, thereby verifying that $EC_1$ unambiguously represents the identity of requester 301. This is called "identity proofing".

c) If requester 301 is successfully proofed, issuer 302 uses their identity engine 204 to affix a declaration (e.g. "proofed") to $EC_1$, uses embossing key $\epsilon_2$ of $EC_2$ to create and affix a digital seal to $EC_1$, and returns newly sealed e-credential $EC_1$ to requester 301.

Having completed steps 4) a), b) and c), issuer 302 thereby attests to the identity of requester 301 which attestation issuers 302 cannot repudiate because the digital seal under embossing key $\epsilon_2$ cryptographically binds the identity of issuer 302 to the identity of the requester 301.

5) Users 301 and 303 exchange and use e-credentials proofed and attested to by $3^{rd}$ parties to establish secure sessions 394. E-credential $EC_1$ of user 301 has been digitally sealed and issued by user 302 (per 392); and e-credential $EC_3$ of user 303 has been digitally sealed by the local bank manager, a notary public, of user 303. Users 301 and 303 are not known to each other and wish to establish a secure session between them. To achieve appropriate identity assurances, they employ their identity engines 204 to execute the following steps:

a) Executing steps 3) a), b) and c), (see 390) users 301 and 303 use e-credentials $EC_1$ and $EC_3$ to establish a persistent secure session between them wherein neither user is initially certain that the identifying information specified in the credential provided by the other user actually represents the other user.

b) However, users 301 and 303, by means of their identity engines, observe that e-credentials of the other user ($EC_1$ and $EC_3$) have been proofed and digitally sealed by $3^{rd}$ parties:

i) User 301 uses $i_3$ of $EC_3$ to inspect and verify the digital seal applied to $EC_3$ and thereby becomes satisfied that the issuer (the bank manager) is sufficiently trusted to believe that the identity specified by $EC_3$ is that of user 303.

ii) Similarly, user 303 uses $i_1$ of $EC_1$ to inspect and verify the digital seal applied to $EC_1$ and thereby becomes satisfied that issuer 302 is sufficiently trusted to believe that the identity specified by $EC_1$ is that of user 301.

c) Given these assurances, users 301 and 303 can proceed with their session with assurances that they are communicating with a sufficiently qualified collaborator.

By way of steps 1 to 5, identity assurances are provided among collaborating parties whereby a user with a personal identity device: is persistently bound to their device and the digitally sealed and issued e-credentials contained therein; is able to determine that an e-credential provided by a remote user must have been originated by that user; can determine that messages originated under this e-credential cannot be repudiated; can verify that the originating user is the sole party capable of reading messages employing that e-credential. An e-credential owner can also affix digital seals to e-credentials, documents and messages that can be verified ("inspected") by other users wherein the user creating and affixing such seals cannot repudiate having digitally sealed them.

Now referring to FIG. 4 depicting electronic credentials (e-credentials) and relationships 400 described at various levels of detail including: an e-credential 401 of an owner (a user), an e-credential template 450, a default e-credential of the subject owner 402, e-credentials of issuers 403, e-credentials of other users 404, and personal identifying information 405 of the owner. Depicted electronic credential 401 is an exemplar information structure for other credentials including e-credential template 450, default e-credential 402, e-credentials of issuers 403, and e-credentials of other users 404 (other users can also be issuers, for example, when users cross-issue e-credentials to each other).

FIG. 4 depicts various relationships including the e-credential of the owner 401 referencing attached personal identifying information 405; e-credentials of issuers 403 having been used to create, affix and issue 406 digital seals 407 to e-credential 401; and e-credential 401 having been used to create, affix and issue 408 digital seals 409 to e-credentials of other users 404. Depicted default credential 402 represents a digitally self-sealed 410 e-credential that can be used to seal and issue e-credentials and electronic documents.

E-credential of the owner 401 has e-credential attributes 411 including an e-credential identifier, issue date, expiry date, and credential type, these elements specified when e-credential 401 was created. The e-credential additionally specifies attributes of the owner 412 including name(s) and identifier(s), distinguishing features (physical attributes of the subject owner), life events (e.g. birth, marriage, and divorce dates), endorsements, restrictions, and attached (personally) identifying information. For every digital seal 413 affixed to e-credential 401, an issuing record 414 is created by the issuer specifying the conditions under which the digital seal was created including: the encounter date(s); the types of encounters (in-person, online); the number of years that the subject has been known to the issuer; relevant certifications and qualifications of issuer (e.g. vetting and proofing experience, professional obligations, notarization qualifications); jurisdiction, policies and procedures applicable the issuing encounter; references to the documents that were proofed, if any; the attributes of the e-credential owner that were attested to by issuer 440; and attributes of the subject, if any, that were conferred upon the e-credential owner by issuer 441.

Every e-credential 401 issued also specifies a digital seal image 423 and is associated with three (3) public-private key pairs 416 where public keys 417 are embedded into e-credential 401, and where the paired private keys 418 are in protected memory store 213 of the owner's personal identity engine 202, said public-private key pairs including a signing-verification key pair used to create and verify digital signatures applied to documents and messages 442; an encryption-decryption key pair used to encrypt and decrypt documents and messages 443; and an embossing-inspection key pair used in conjunction with the digital seal image 423 where the embossing key is used to create digital seals 444, and the inspection key is used to verify digital seals 445.

FIG. 5 depicts a method for handling digital seals 500 applied to electronic artifacts including e-credentials, documents and messages. Functions for affixing a digital seal 519 and inspecting a digital seal 520 are depicted. Affixing a digital seal 519 is comprised of a hash digest function 530, an emboss function 532 and an affix function 534. Inspecting a digital seal 520 is comprised of an extract function 540, an inspect function 541, a hash result function 542 and a compare function 543.

Affixing a digital seal 519 creates and affixes a digital seal to electronic artifact 501 by:

a) selecting an e-credential 521 of the owner and pre-determined attributes 522 of e-credential, including at least the e-credential identifier 517, the digital sealing image 523 and the private embossing key 525;

b) selecting pre-determined elements 526 of the electronic artifact 501, including at least the electronic artifact identifier 503;

c) the e-credential owner specifying an attestation 510 and issue date 512 characterizing the electronic artifact;

d) concatenating 510, 512, 522 (including at least 517), 523 and 526 (including at least 503) yielding digest 529;

e) using hash digest 530 to yield hashed digest 531;

f) using emboss 532 and the embossing key 525, a private encryption key, to encrypt the hashed digest 531 yielding digital seal signature 533;

g) using affix 534 to combine the digital sealing image 523, attestation 510, issue date 512, the e-credential identifier 517, electronic artifact identifier 503, and digital seal signature 533, rendering digital seal 528, and then affixing 528 to the electronic artifact 501 by using the electronic artifact identifier 503 to logically bind 505 the digital seal 528 to the electronic artifact 501;

Inspecting a digital seal 520 extracts and verifies digital seal 528 affixed to artifact 501 by:

a) using extract 540 to extract from digital seal 528, the attestation 510, the issue date 512, e-credential identifier 517, electronic artifact identifier 503, and digital seal signature 533, subsequently acquiring pre-determined identifying attributes 522, inspection key 524, and pre-determined elements 526;

b) concatenating 510, 512, 522, (including at least 517), 523, 526 (including at least 503), yielding result 544;

c) applying hash result 542 to result 544 yielding hashed result 545;

d) using inspect 541 and the inspection key 524 to decrypt the extracted digital seal signature 533 yielding expected hash 546; and e) using compare 543 to match hashed result 545 to expected hash 546 indicating "digital seal verified" 547 if 545 and 546 match, else indicating "digital seal failed to verify" 548 if 545 and 546 do not match.

FIG. 6 depicts a usage scenario illustrating the issuing of a true copy e-credential of a physical credential 600 such as a driver's license. E-credential requester 601 uses their personal identity device 202 to take 602 a digital photograph 603 of a physical credential 604 (e.g. requester's driver's license). By means of the requester's personal identity device 202, requester 601 prepares an e-credential request 605 by populating an e-credential template 450 and attaching digital photograph 603 to request 605. By means of a mutually trusted channel 606 submits request 605 to the personal identity device 202 of a e-credential issuer 607. By means of an in-person or online encounter, issuer 607 performs identity proofing 608 of recipient 601 with respect to the submitted e-credential request 605 and the attached digital photograph 603 of physical credential 604, and other personal identifying information that may be required. Finally, upon successful identity proofing, issuer 607, by means of the issuer's personal identity device 204, issues a true copy e-credential 609 of physical credential 604 to the personal credentialing device 202 of the requester 601, and writes a copy of the true copy e-credential 609 and a transaction record 610 to an e-credential registry 611.

FIG. 7 depicts a usage scenario illustrating the issuing of a true copy self-photograph e-credential 700, for example, one associated with other personal identifying information to create an electronic business card. The e-credential requester 701 uses their personal identity device 202 to take 702 a digital self-photograph 704. By means of the requester's personal identity device 202, requester 701 prepares an e-credential request 703 by populating an e-credential template 450 and attaching the digital self-photograph 704 to request 703. By means of a mutually trusted channel 705, requester 701 submits request 703 with attached digital self-photograph to the personal identity device 202 of e-credential issuer 706. By means of in-person or online encounter, issuer 706 performs identity proofing 707 of recipient 701 with respect to submitted e-credential request 703, the attached self-photograph 704, and other personal identifying information that may be required. Finally, upon successful identity proofing, issuer 706, by means of the issuer's personal identity device 202 and the mutually trusted channel 705, issues a true copy self-photograph e-credential 709 to the personal identity device 202 of requester 701, and writes the true copy self-photograph e-credential 709 and a transaction record 710 to e-credential registry 711.

FIG. 8 depicts a usage scenario illustrating the issuing of an original electronic credential (e-credential). The e-credential requester 801 uses their personal identity device 202 to populate an e-credential template 450 to prepare an e-credential request 802. By means of mutually trusted channel 803, requester 801 submits request 802, possibly attaching other relevant personal identifying information, to issuer 804 by way of the issuer's personal identity device 202. By means of an in-person or online identity encounter, issuer 804 performs identity proofing 805 of requester 801 with respect to the submitted request 802, other personal identifying information that may be attached including physical credentials 806 that may be required, and personal identifying information that may be retrieved from the issuer's e-credential registry 807. Upon successful identity proofing, issuer 804 uses their personal identity device 202 to take a digital photograph 808 of requester 801, attaches the digital photograph to the submitted e-credential request 802, digitally seals e-credential request 802 thereby creating new e-credential 809. Finally, issuer 804, by means of the issuer's personal identity device 202 and mutually trusted channel 803, sends digitally sealed e-credential 809 to the personal credentialing device 202 of requester 801, and writes a copy of e-credential 809 and transaction record 811 to e-credential registry 807.

FIG. 9 depicting alternate embodiments 900, includes a user 920, a smart phone 901, a tablet computer 902, a laptop computer 903, and a personal computer 904. Persons skilled in the art will recognize that many hardware and software variations, configurations and deployments of the inventive subject matter are possible. For example, various biometric mechanisms, digital camera configurations, and operating systems may be configured for any given personal identity device.

FIG. 9 also depicts possible future embodiments that could be developed and integrated to support the installation and deployment of the inventive subject matter including a smart card 905, a smart ring 906, a smart watch 907, and smart glasses 908. For example, instead of being maintained within a single personal credentialing device 202 (e.g. smart phone 901), the user's e-credentials 909 with embedded public keys, paired with private keys 912 in protected memory store 911 could be otherwise deployed. FIG. 9 depicts user 920 having a smart phone 901 communicating over pre-configured trusted communication channels 910 with a smart card 905 or a smart ring 906 with embedded protected memory store 911 containing private keys and secrets 912 of user 920. FIG. 9 also depicts a smart watch 907 containing e-credentials 909 of user including embedded public keys. Smart glasses 908 could be similarly created and integrated with a smart phone 901. For example, the smart glasses 908 could (i) retrieve private keys 912 from the smart ring 906, (ii) read an encrypted page into the smart glasses 908, (iii) decrypt the page; and (iv) render the decrypted page in plain text on the inner surface of the smart glasses 908 for user 920 to read. Such an embodiment avoids decryption of documents within the user's personal identity device, thereby decreasing the risk of document tampering. Another embodiment would be for e-credentials of the user 909 and private keys 912 to be maintained in smart card 905 communicating with the user's smart phone 901. Those skilled in the art will recognize that segmenting the artifacts of the inventive subject matter among distinct hardware devices reduces identity theft risk.

FIG. 10 depicts the potential scope of electronic identity and credentialing usage 1000. This figure shows user 1001 holding a personal identity device 204 containing a group of electronic credentials 1003 to 1013 issued to user 1001. This figure also shows representative credential issuers 1002 holding personal credentialing devices who have issued electronic credentials to user 1001. Grouping 1020 represents individual users who can issue simple e-credentials to user 1001 such as true copy photographs 1003. Grouping 1022 represents individual users with elevated qualifications and obligations sufficient, for example, to issue certified true copies of driver's licenses. Grouping 1021 represents organizations and networks without credential issuing agents that nevertheless accept electronic credentials 1003, 1004 and 1007. Groupings 1023 to 1028 represent institutions and organizations having credentialing agents (authorities) charged with issuing e-credentials to employees, customers and the public. The example of departments of motor vehicles (DMVs) 1025 illustrates wide dissemination and usage of electronic driver's licenses across most groupings. Grouping 1029 represents e-business merchants and suppliers who mainly leverage electronic credentials issued by the credential issuers of the other groupings.

Now referring to FIG. 11 relating physical credentialing, prior art PKI and PGP technologies, and e-credentialing system 1100. FIG. 11A depicts a physical credentialing system; FIG. 11B depicts prior art Public Key Infrastructure (PKI); FIG. 11C depicts prior art Pretty Good Privacy (PGP); and FIG. 11D depicts the inventive subject matter, an electronic identity and credentialing system.

FIG. 11A depicts a physical credentialing system illustrating the range of identifying attributes 1101 of a person mapped to physical credentials 1102 and other personal identifying information 1103 of a user 1104. When requesting physical credential 1105, the user 1104, submits their existing physical credential(s) 1102 and other identifying information 1103 to an agent 1106 of the credential issuing organization, together with a credential request 1107 (a completed application form) specifying selected identifying attributes 1101 of the user to the agent 1106. The agent 1106 proofs the provided information, issues 1108 credential 1105 to the user 1104, and writes transaction record 1109 into the credential registry 1110.

FIG. 11B depicts a Public Key Infrastructure (PKI) usage scenario wherein a certificate authority (C) 1120, an identity provider, possesses a signed (digital) certificate 1121 with public key $q_c$, matching private key $p_c$, with digital signature $ds_r$, signed and issued by root certificate authority 1122. In response to a certificate request 1123 from user X 1124, certificate authority (C) 1120 generates, signs, and issues 1126 to user 1124 a signed (digital) certificate (name=X) 1125 with public key $q_x$, private key $p_x$, and digital signature $ds_c$ calculated using signed digital certificate 1121 of certificate authority 1120.

FIG. 11C depicts a Pretty Good Privacy (PGP) usage scenario where user A 1140 requests user B 1141 to digitally sign and return user A's digital certificate. Initially, using installed PGP software, user A creates an unsigned digital certificate (name=A) 1142 containing public key $q_a$ paired with private key $p_a$ stored outside the context of certificate 1142. User B similarly creates an unsigned digital certificate (name=A) 1143 containing public key $q_b$ paired with private key $p_b$ stored outside the context of certificate 1143. On an ad hoc basis, user A and user B agree to exchange digital certificates, for example, by secure email using pre-determined symmetric encryption keys. User A sends unsigned digital certificate 1144 to user B (private key $p_a$ is not sent to user B) requesting user B to digitally sign user A's digital certificate. User B, upon receiving user A's digital certificate 1144, uses user B's private key $p_b$ to digitally sign user A's digital certificate 1144, calculating and affixing digital signature $ds_b$ to user A's digital certificate and subsequently sending the signed digital certificate 1145 to user A. The PGP software finally associates 1146 private $p_a$ with the newly signed digital certificate 1147.

FIG. 11D depicts a usage scenario of the present invention, namely, an electronic identity and credentialing system. This figure illustrates user A 1160, user B 1161 and user C 1162 using their respective personal identity devices 1163, 1164, 1165 to request and issue an e-credential for user A, wherein user A requests an e-credential, and both user B and user C issue a new e-credential to user A following a round-robin issuing process 1166→1167→1168. After installation and setup, the personal identity devices of users A, B and C each contain a self-sealed default e-credential 1169 with digital sealing image, public keys, and associated private keys (FIG. 11D only depicts the default e-credential 1169 of user A). User A completes an e-credential request 1170 initialized with digital sealing image, public keys, and associated private keys, specifying selected attributes of the user, possibly attaching other personal identifying information, and then selecting default credential 1169 to digitally seal 1171 e-credential request 1170. User A subsequently sends (1166) the e-credential request 1172 (not including private keys) to user B. User B verifies digital seal 1171 of e-credential request 1170, proofs user A against the contents of e-credential request 1170, and if verified, calculates and affixes digital seal ($d\hat{s}_b$) to e-credential request 1170. User B then forwards (1167) the partially sealed and issued e-credential, to user C who follows the same proofing and verification steps as user B, affixing a digital seal ($d\hat{s}_c$) and issuing (1168), now doubly sealed e-credential 1173, to user A. Upon receiving newly issued e-credential 1173, the original e-credential request is replaced by the newly created e-credential, digitally sealed by a selected e-credential of the requester (e.g. default credential 1169) (thereby becoming triply sealed 1171), and the private keys originally associated with the e-credential request are re-associated with the newly issued e-credential 1174.

The present invention provides several improvements and advantages over prior art PKI and PGP identity systems including:

(a) Private keys are never revealed outside the context of the user's personal identity device, while PKI certificate authorities allow the distribution of private keys over networks;

(b) Supports e-credentials that can contain a range of personal identifying information while PKI and PGP digital certificates can specify only names and identifiers;

(c) Enables an e-credential owner to be crypto-logically bound to their e-credential by three (3) encryption key pairs while PKI and PGP digital certificates specify only a single key pair;

(d) E-credentials support three (3) public-private key pairs used for distinct purposes while PKI and PGP digital certificates allow sharing a single encryption key across multiple applications;

(e) By means of digital sealing, an e-credential issuer cannot repudiate having issued an e-credential. Digital signatures applied to PKI and PGP digital certificates can be repudiated;

(f) An owner's personal identity device logically binds the owner's authentication data to their e-credentials and hence to the owner. PKI and PGP do not support such binding mechanisms;

(g) The present invention supports $3^{rd}$ party attestation of e-credentials among device owners. PKI provides only server-centric attestations;

(h) Provides a mechanism for personalizing and visualizing a digital seal applied to e-credentials, documents and messages. PKI and PGP do not specify such mechanisms.

Disadvantages (a) Personal identity devices are not normally shared while desktops and laptops are commonly shared. Tablet computers and smart phones are less likely to be shared. Given the risks of sharing, personal identity devices should not be shared.

(b) The present invention does not describe how the system will be integrated with identity services and service providers, or how the inventive subject matter can be transitioned from prior art identity systems such as public key infrastructure based systems. These tasks are left to others to solve.

(c) The inventive subject matter is more complex than the cited relevant prior art. Although the additional effort required for deployment and operation may appear to be a disadvantage, it is believed that the benefits of reduced identity theft and electronic fraud will off-set this apparent disadvantage.

During the discovery effort, several meaningful insights into electronic identity and credentialing emerged, leading to unanticipated discoveries and novel features that enhanced the utility of the present invention. For example, the initial phase of the discovery process did not anticipate the potential of digital cameras embedded into a user's personal identity device. Nor did it consider applying some of the practices of notary publics when proofing personal identifying information.

Digital Sealing Method: Notary practices stimulated the discovery of the present invention's method for digitally applying seals to e-credentials and other electronic documents. The notary's process suggested a powerful technical solution that can also be rendered programmatically. This discovery process began by observing that a notary public, after proofing a document, uses their embosser (a stamping device) to impress their seal onto documents to be notarized. The purpose of the seal is to detect tampering with both the document and the seal itself. The notary's impressed seal is also useful to trace the proofing and sealing event back to the notary's registry. This manual process motivated the creation of the present invention's digital sealing method whereby the issuer's embossing key is used to create a digital seal signature that cryptographically binds and protects both the sealed document and the seal, containing selected attributes of the issuer, against tampering. The inspection key, a public key paired with the embossing key, is used to verify the digital seal signature to detect both tampering with the seal and the document. Because these keys are bound to the e-credentials of the owner, an issuer using their embossing key when digitally sealing a document, cannot repudiate having applied this key, and hence the seal.

Personalized Digital Seals: It was observed that a notary's seal includes a commission number, expiry date, jurisdiction, and possibly other identifying attributes of the notary. Furthermore, because notary is licensed by a given jurisdiction, seals often incorporate images such as state animals, flowers, landmarks. This motivated the idea of personalizing digital seals by enabling the specification of a "sealing image" [e.g. a jpg or bitmap] for every credential. Furthermore, the digital sealing process was enhanced by including the sealing image in the calculation of the digital seal signature, thereby protecting the seal image as well as the document and the contents of the seal, containing selected attributes of the issuer, from tampering. This technical feature enables visualization improvement opportunities. For example, software renderings of a cryptographically bound sealing image (e.g. photos, logos, written signatures), if tampered with, could be rendered with a strong warning and prevent certain operations that might put the user at risk.

Notaries and Integrated Digital Cameras: Examining the best practices of Notary Publics combined with the photographic capabilities of mobile computing devices stimulated unanticipated new types of electronic credentials that exploit front-facing and forward-facing cameras. It was derived from the process of certifying true copies of legal documents [e.g. birth certificates and citizenship papers] and application of the notary's embosser to impress the notary's seal onto the document.

Certified True Copy E-Credentials: This refinement of the present invention involves the application of the forward-facing camera of a mobile device: taking a digital photograph of a physical credential [e.g. a driver's license]; creating and completing a credential template; attaching the photograph to the template; and submitting a new e-credential request to the issuer's personal identity device. Upon successful proofing of the physical credential and the attached photograph, the issuer creates a new e-credential and attaches the photograph to the new e-credential by way of the user's personal identity device. Finally, the issuer selects an embossing key to digitally seal both the new credential and the attached photograph, remitting this "certified true copy e-credential" to the user.

Certified True Translation Credentials: The above true copy example stimulated the idea of creating additional types of true copy variants by means of the forward-facing camera including true copy translations of birth certificates written in other languages.

Certified True Copy Photographs: The above examples stimulated additional refinements. In the first case the user takes a digital self-portrait using the front-facing camera; attaches the photograph to the new credential request; and the issuer returns a digitally sealed certified true copy credential with the attached photograph also digitally sealed. The second case involves a photograph being taken by the issuer's forward-facing camera and returning the sealed credential and sealed photograph.

Identity Proofing with Multi-Media Conferencing: The potential application of multi-media conferencing, using cameras and audio, was not anticipated until the identity assurance implications of in-person and known-person identity proofing became fully appreciated:
   a) For in-person identity proofing, the person requesting an e-credential person need not be known to the e-credential issuer. However, personal identifying information, including at least one physical credential (e.g. a driver's license), should be required;
   b) For known-person identity proofing where the requester and issuer have known each other personally for a prescribed period of time (e.g. 2 or more years), personal identifying information may not be deemed to be necessary;
   c) Under both in-person and known-person identity proofing scenarios, depending on the level of perceived risk, it may be advisable for the collaborating users to establish a mutually trusted channel between their personal identity devices.
   d) When e-credentialing over an online application (like video conferencing), depending on the perceived risk, it may be acceptable for collaborating users to exchange a one-time secret over an alternate channel, and use that secret to create a shared symmetric encryption key to establish the mutually trusted channel.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method for handling digital seals affixed to an electronic artifact in a personal identity device operable by a device owner in a computing system that includes one or more servers, identity services, service providers and a memory storing personal information of the personal identity device, coupled via a web network, the method comprising the steps of:
   initiating a digital seal affixation to the electronic artifact using an e-credential of the device owner and the personal identity device of the owner;
   selecting pre-determined identifying attributes of the e-credential including at least the e-credential identifier, the digital sealing image and the private embossing key (c);
   selecting pre-determined elements of the electronic artifact including at least the electronic artifact identifier;
   specifying an attestation of the owner characterizing the pre-determined elements of the electronic artifact, and the issue date for the digital seal;
   concatenating the attestation, the issue date, the pre-determined identifying attributes of the e-credential including at least the e-credential identifier, the digital sealing image, and the pre-determined elements of the electronic artifact including at least the electronic artifact identifier, yielding a digest; hashing the digest, yielding a hashed digest;
   encrypting the hashed digest using the private embossing key of the e-credential, yielding a digital seal signature;
   combining at least, the digital sealing image, the attestation, the issue date, the e-credential identifier, the electronic artifact identifier, and the digital seal signature, yielding a digital seal; and
   affixing the digital seal to the electronic artifact by graphically rendering the digital seal using digital sealing image and binding the electronic artifact identifier of the digital seal with the electronic artifact identifier; and
   whereby the owner of the personal identity device cannot repudiate having used the e-credential of the owner to affix the digital seal and the attestation to the electronic artifact.

2. The method for handling digital seals as in claim 1 further comprising the steps of:
   initiating a verification of the digital seal and the attestation affixed to the electronic artifact using the personal identity device of the owner;
   extracting from the graphically rendered digital seal affixed to the electronic artifact, at least the attestation, the issue date, the e-credential identifier, the electronic artifact identifier, and the digital seal signature;
   acquiring by means of the e-credential identifier, the pre-determined identifying attributes of the e-credential including at least the e-credential identifier, the digital sealing image and the inspection key (i);
   acquiring by means of the electronic artifact identifier, the pre-determined elements of the electronic artifact including at least the electronic artifact identifier;
   concatenating the attestation, the issue date, the pre-determined identifying attributes of the e-credential including at least the e-credential identifier, the digital sealing image, and the pre-determined elements of the electronic artifact including at least the electronic artifact identifier, yielding a result;

hashing the result, yielding a hashed result;

decrypting the digital seal signature using the public inspection key (i) of the e-credential, yielding an expected hash;

comparing the hashed result to the expected hash raising a notification that the digital seal verified if the hashed result matches the expected hash, and raising a notification that the digital seal failed to verify if the hashed result does not match the expected hash; and whereby the owner of the personal identity device can verify that the attestation was affixed to the electronic artifact using the digital seal and the e-credential.

* * * * *